United States Patent
Ko et al.

(10) Patent No.: US 9,473,227 B2
(45) Date of Patent: Oct. 18, 2016

(54) METHOD AND APPARATUS FOR TRANSMITTING CODEBOOK-BASED SIGNAL IN WIRELESS COMMUNICATION SYSTEM

(71) Applicant: LG ELECTRONICS INC., Seoul (KR)

(72) Inventors: Hyunsoo Ko, Anyang-si (KR); Jinmin Kim, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 114 days.

(21) Appl. No.: 14/418,810

(22) PCT Filed: Aug. 26, 2013

(86) PCT No.: PCT/KR2013/007619
§ 371 (c)(1),
(2) Date: Jan. 30, 2015

(87) PCT Pub. No.: WO2014/035102
PCT Pub. Date: Mar. 6, 2014

(65) Prior Publication Data
US 2015/0207547 A1 Jul. 23, 2015

Related U.S. Application Data

(60) Provisional application No. 61/693,320, filed on Aug. 26, 2012.

(51) Int. Cl.
*H04L 12/26* (2006.01)
*H04B 7/04* (2006.01)
(Continued)

(52) U.S. Cl.
CPC ............ *H04B 7/046* (2013.01); *H04B 7/0417* (2013.01); *H04B 7/0456* (2013.01);
(Continued)

(58) Field of Classification Search
CPC .. H04W 24/00; H04L 43/50; H04L 43/0852; H04L 43/08; H04B 17/003
See application file for complete search history.

(56) References Cited

U.S. PATENT DOCUMENTS

2012/0076236 A1 3/2012 Ko et al.
2013/0258964 A1* 10/2013 Nam ................... H04W 72/046
370/329

(Continued)

FOREIGN PATENT DOCUMENTS

| KR | 10-2010-0102512 A | 9/2010 |
| WO | WO 2010/104343 A2 | 9/2010 |
| WO | WO 2011/098670 A1 | 8/2011 |
| WO | WO 2011/120760 A1 | 10/2011 |

OTHER PUBLICATIONS

Alcatel-Lucent Shanghai Bell et al., "Considerations on CSI feedback enhancements for high-priority antenna configurations," 3GPP TSG-RAN WG1 #66, Aug. 22-26, 2011, 7 pages, R1-112420.

*Primary Examiner* — Hassan Phillips
*Assistant Examiner* — Siren Wei
(74) *Attorney, Agent, or Firm* — Birch, Stewart, Kolasch & Birch, LLP

(57) ABSTRACT

The present invention relates to a wireless communication system, and more specifically, disclosed are a method and an apparatus for transmitting a codebook-based signal. A method for transmitting channel state information from a terminal in the wireless communication system, according to one embodiment of the present invention, comprises the steps of: measuring a downlink channel from a downlink signal that is received from a base station; determining a first precoding matrix indicator (PMI) and a second PMI of the downlink channel based on the measurement of the downlink channel; and transmitting the first PMI and the second PMI to the base station, wherein the first PMI indicates a first precoding vector that includes a first elevation angle component of a multi-antenna of the base station, the second PMI indicates a second precoding vector that includes a second elevation angle component and an azimuth angle component of the multi-antenna of the base station, and wherein resolution of the azimuth angle component can be determined based on the first elevation angle component or the second elevation angle component.

15 Claims, 9 Drawing Sheets

(51) Int. Cl.
    *H04B 7/06*     (2006.01)
    *H04L 5/00*     (2006.01)
    *H04W 24/08*     (2009.01)
    *H04W 72/04*     (2009.01)

(52) U.S. Cl.
    CPC ......... *H04B 7/0617* (2013.01); *H04B 7/0619* (2013.01); *H04B 7/0626* (2013.01); *H04B 7/0639* (2013.01); *H04L 5/0053* (2013.01); *H04W 24/08* (2013.01); *H04W 72/0413* (2013.01); *H04L 5/0091* (2013.01)

(56) References Cited

U.S. PATENT DOCUMENTS

| | | | |
|---|---|---|---|
| 2013/0308715 A1* | 11/2013 | Nam | H04B 7/0469 375/267 |
| 2014/0003240 A1* | 1/2014 | Chen | H04W 28/08 370/235 |
| 2014/0016549 A1* | 1/2014 | Novlan | H04B 7/0417 370/328 |
| 2014/0029684 A1* | 1/2014 | Shirani-Mehr | H04B 7/0469 375/267 |

\* cited by examiner (a)

(b)

(a)

(b)

(c)

(a)

(b)

(a)

(b)

METHOD AND APPARATUS FOR TRANSMITTING CODEBOOK-BASED SIGNAL IN WIRELESS COMMUNICATION SYSTEM

CROSS REFERENCE TO RELATED APPLICATIONS

This application is the National Phase of PCT International Application No. PCT/KR2013/007619, filed on Aug. 26, 2013, which claims priority under 35 U.S.C. 119(e) to U.S. Provisional Application No. 61/693,320, filed on Aug. 26, 2012, all of which are hereby expressly incorporated by reference into the present application.

TECHNICAL FIELD

The present invention relates to a wireless communication system, and more particularly, to a method and apparatus for transmitting a codebook-based signal.

BACKGROUND ART

Multi-Input Multi-Output (MIMO) technology is to improve efficiency in data transmission and reception by using multiple transmitting antennas and multiple receiving antennas instead of a single transmitting antenna and a single receiving antenna. If a single antenna is used, a receiver receives data through a single antenna path. However, if multiple antennas are used, the receiver receives data through various paths. Accordingly, speed and amount in data transmission may be increased, and coverage may be increased.

In order to increase multiplexing gain of MIMO operation, channel status information (CSI) may be fed back from a MIMO receiver to a MIMO transmitter. The receiver may determine CSI by performing channel measurement through a predetermined reference signal (RS) from the transmitter.

DISCLOSURE

Technical Problem

An object of the present invention is to provide a method and apparatus for transmitting a signal by using a codebook for supporting a 2-dimensional antenna structure normally efficiently. Also, another object of the present invention is to provide a method and apparatus for transmitting a signal by using a codebook that may reduce feedback overhead while maintaining system throughput with respect to MIMO transmission based on a 2-dimensional antenna structure.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problem, according to one embodiment of the present invention, a method for transmitting channel status information from a user equipment in a wireless communication system comprises the steps of measuring a downlink channel from a downlink signal that is received from a base station; determining a first precoding matrix indicator (PMI) and a second PMI of the downlink channel on the basis of the measured result of the downlink channel; and transmitting the first PMI and the second PMI to the base station, wherein the first PMI indicates a first precoding vector that includes a first elevation angle component of a multi-antenna of the base station, the second PMI indicates a second precoding vector that includes a second elevation angle component and an azimuth angle component of the multi-antenna of the base station, and resolution of the azimuth angle component is determined based on the first elevation angle component or the second elevation angle component.

To solve the aforementioned technical problem, according to another embodiment of the present invention, a user equipment for transmitting channel status information in a wireless communication system comprises a receiver; a transmitter; and a processor, wherein the processor is configured to measure a downlink channel from a downlink signal that is received from a base station through the receiver, determine a first precoding matrix indicator (PMI) and a second PMI of the downlink channel on the basis of the measured result of the downlink channel, and transmit the first PMI and the second PMI to the base station by using the transmitter, the first PMI indicates a first precoding vector that includes a first elevation angle component of a multi-antenna of the base station, the second PMI indicates a second precoding vector that includes a second elevation angle component and an azimuth angle component of the multi-antenna of the base station, and resolution of the azimuth angle component is determined based on the first elevation angle component or the second elevation angle component.

To solve the aforementioned technical problem, according to still another embodiment of the present invention, a method for receiving channel status information from a base station in a wireless communication system comprises the steps of transmitting a downlink signal, which is used for measurement of a downlink channel of a user equipment, to the user equipment; and receiving a first precoding matrix indicator (PMI) and a second PMI determined based on the measured result of the downlink channel from the user equipment, wherein the first PMI indicates a first precoding vector that includes a first elevation angle component of a multi-antenna of the base station, the second PMI indicates a second precoding vector that includes a second elevation angle component and an azimuth angle component of the multi-antenna of the base station, and resolution of the azimuth angle component is determined based on the first elevation angle component or the second elevation angle component.

To solve the aforementioned technical problem, according to further still another embodiment of the present invention, a base station for receiving channel status information in a wireless communication system comprises a receiver; a transmitter; and a processor, wherein the processor is configured to transmit a downlink signal, which is used for measurement of a downlink channel of a user equipment, to the user equipment by using the transmitter, and receive a first precoding matrix indicator (PMI) and a second PMI determined based on the measured result of the downlink channel from the user equipment by using the receiver, the first PMI indicates a first precoding vector that includes a first elevation angle component of a multi-antenna of the base station, the second PMI indicates a second precoding vector that includes a second elevation angle component and an azimuth angle component of the multi-antenna of the base station, and resolution of the azimuth angle component is determined based on the first elevation angle component or the second elevation angle component.

The followings may commonly be applied to the embodiments according to the present invention.

The resolution of the azimuth angle component may be set to be high if a beam formed by the multi-antenna is toward a long distance in a horizontal direction from the multi-antenna, whereas the resolution of the azimuth angle component may be set to be low if the beam formed by the multi-antenna is toward a short distance in a horizontal direction from the multi-antenna.

The resolution of the azimuth angle component may be set to be high if the elevation angle becomes close to 'horizontal' but be set to be low if the elevation angle becomes close to 'vertical'.

The azimuth angle component may be $n_a/N_a$, $N_a$ may be the number of beams orthogonal to an azimuth angle direction, and $n_a=0, 1, 2, \ldots, N_a-1$.

The $N_a$ may be set to be a great value if the second elevation angle component becomes close to 1 but be set to be a small value if the second elevation angle component becomes close to 0.

The second elevation angle component may be $\sin(\theta)$, and $\theta$ may be a value of the elevation angle.

The first elevation angle component may be $n_e/N_e$, $N_e$ may be the number of beams orthogonal to an elevation angle direction, and $n_e=0, 1, 2, \ldots, N_e-1$.

$N_{a@n_e=0} > N_{a@n_e=1} > N_{a@n_e=2} > \ldots > N_{a@n_e=N_e-1}$, and $N_{a@n_e=k}$ may be a value of $N_a$ when $n_e=k$.

$$b = \sqrt{1 - \left(\frac{n_e}{N_e}\right)^2},$$

and 'b' may be the second elevation angle component.

$$b = 1 - \frac{n_e}{N_e},$$

and 'b' may be the second elevation angle component.

The first precoding vector may be $a_z$, $a_z(a)=[1\ e^{ja}\ e^{j2a} \ldots e^{ja(M-1)}]^T$, 'a' may be the first elevation angle component, and M may be the number of vertical antennas.

The second precoding vector may be $a_x$, $a_x(b,c)=[1\ e^{jb\cdot c}\ e^{j2b\cdot c} \ldots e^{jb\cdot c(N-1)}]^T$, 'b' may be the second elevation angle component, and N may be the number of horizontal antennas.

The aforementioned embodiments and the following detailed description of the present invention are only exemplary, and are intended for additional description of the present invention cited in claims.

Advantageous Effects

According to the present invention, a method and apparatus for transmitting a signal by using a codebook that may efficiently support MIMO transmission for supporting a 2-dimensional antenna structure may be provided. Also, according to the present invention, a method and apparatus for transmitting a signal by using a codebook that may reduce feedback overhead while maintaining system throughput with respect to MIMO transmission based on a 2-dimensional antenna structure may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Figure 1:
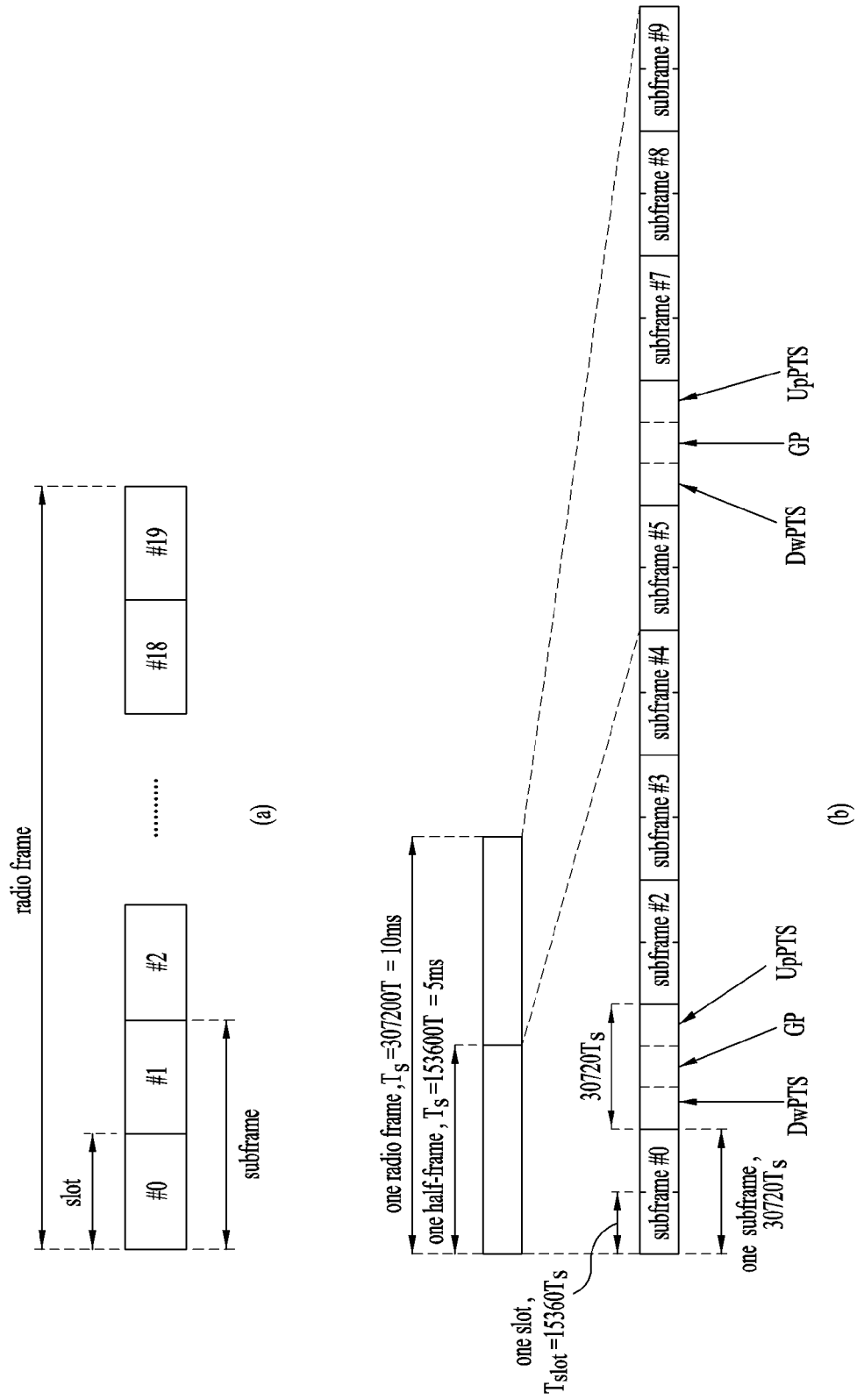
FIG. 1 is a diagram illustrating a structure of a radio frame.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In this specification, the embodiments of the present invention will be described based on data transmission and reception between a base station and a user equipment. In this case, the base station means a terminal node of a network, which performs direct communication with the user equipment. A specific operation which has been described as being performed by the base station may be performed by an upper node of the base station as the case may be.

In other words, it will be apparent that various operations performed for communication with the user equipment in the network which includes a plurality of network nodes along with the base station may be performed by the base station or network nodes other than the base station. At this time, the 'base station' (BS) may be replaced with terminologies such as a fixed station, Node B, eNode B (eNB), and an access point (AP). Also, a relay may be replaced with terminologies such as a relay node (RN) and a relay station (RS). Also, a 'terminal' may be replaced with terminologies such as a user equipment (UE), a mobile station (MS), a mobile subscriber station (MSS), and a subscriber station (SS).

Specific terminologies used in the following description are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among the embodiments of the present invention, apparent steps or parts, which are not described to clarify technical spirits of the present invention, may be supported by the above documents. Also, all terminologies disclosed herein may be described by the above standard documents.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A $3^{rd}$ generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LIE. WiMAX may be described by the IEEE 802.16e standard (WirelessMAN-OFDMA Reference System) and the advanced IEEE 802.16m standard (WirelessMAN-OFDMA Advanced system). For clarification of the description, although the present invention will be described based on the 3GPP LTE/LTE-A, it is to be understood that technical spirits of the present invention are not limited to the 3GPP LTE/LTE-A.

FIG. 1 is a diagram illustrating a structure of a radio frame.

In a cellular OFDM communication system, uplink/downlink data packet transmission is performed in a subframe unit, wherein one subframe is defined by a given time interval that includes a plurality of OFDM symbols. The 3GPP LIE standard supports a type 1 radio frame structure applicable to frequency division duplex (FDD) and a type 2 radio frame structure applicable to time division duplex (TDD).

FIG. 1(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) is a resource allocation unit and may include a plurality of continuous subcarriers in one slot.

The number of OFDM symbols included in one slot may be varied depending on configuration of acyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel status is unstable like the case where the user equipment moves at high speed, the extended CP may be used to reduce inter-symbol interference.

If the normal CP is used, since one slot includes seven OFDM symbols, one subframe includes 14 OFDM symbols. At this time, first two or three OFDM symbols of each subframe may be allocated to a physical downlink control channel (PDCCH), and the other OFDM symbols may be allocated to a physical downlink shared channel (PDSCH).

FIG. 1(b) is a diagram illustrating a structure of a type 2 radio frame. The type 2 radio frame includes two half frames, each of which includes five subframes, a downlink pilot time slot (DwPTS), a guard period (GP), and an uplink pilot time slot (UpPTS). One subframe includes two slots. The DwPTS is used for initial cell search, synchronization or channel estimation at the user equipment. The UpPTS is used for channel estimation at the base station and uplink transmission synchronization of the user equipment. Also, the guard period is to remove interference occurring in the uplink due to multipath delay of downlink signals between the uplink and the downlink. Meanwhile, one subframe includes two slots regardless of the type of the radio frame.

The structure of the radio frame is only exemplary, and various modifications may be made in the number of subframes included in the radio frame, the number of slots included in the subframe, or the number of symbols included in the slot.

Figure 2:
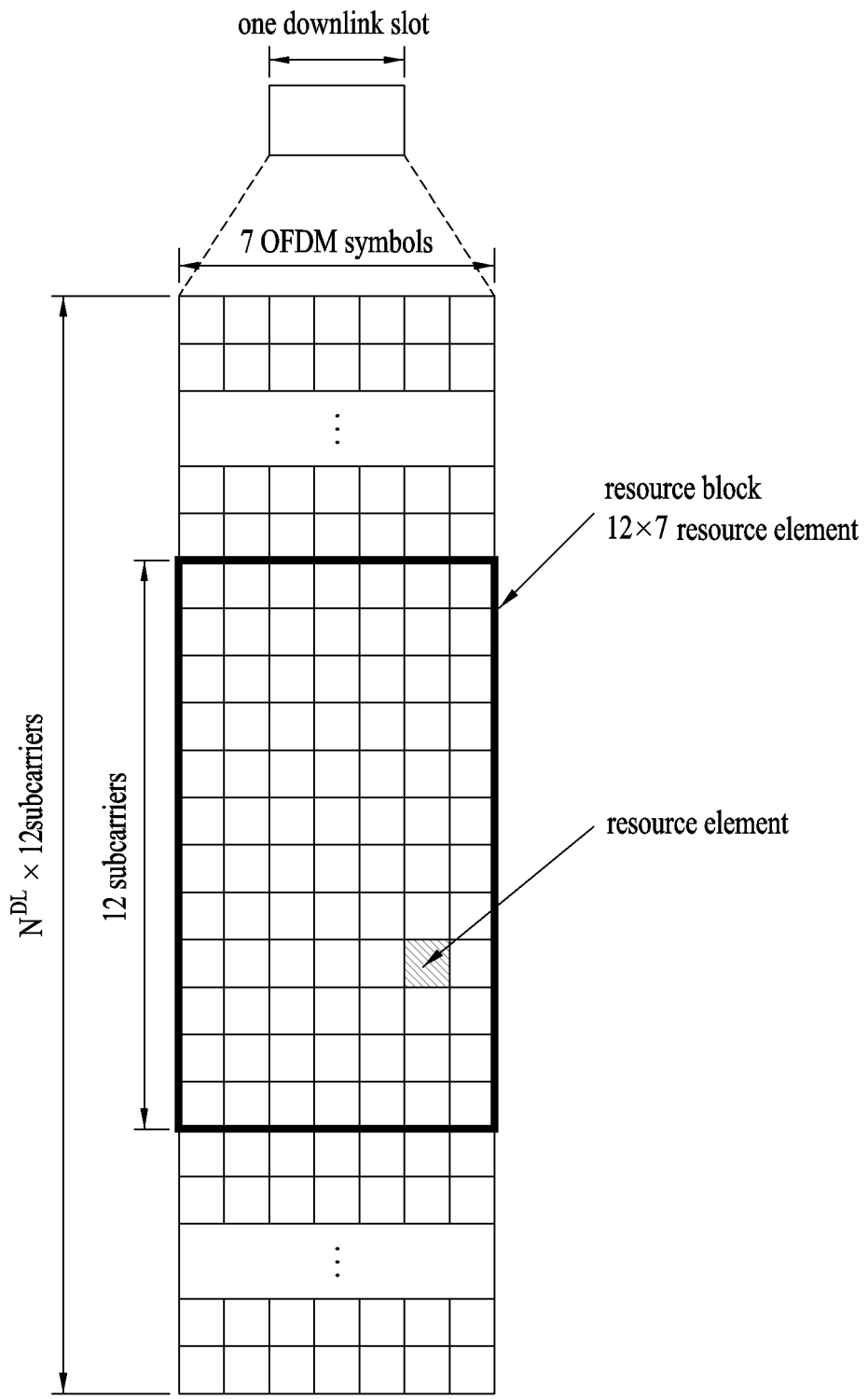
FIG. 2 is a diagram illustrating a resource grid at a downlink slot.

FIG. 2 is a diagram illustrating a resource grid at a downlink slot.

One downlink slot includes, but not limited to, seven OFDM symbols in a time domain, and one resource block (RB) includes, but not limited to, twelve subcarriers in a frequency domain. For example, although one slot includes seven OFDM symbols in case of the normal CP, one slot may include six OFDM symbols in case of the extended CP. Each element on the resource grid will be referred to as a resource element (RE). One resource block (RB) includes 12×7 resource elements. The number $N^{DL}$ of resource blocks (RBs) included in the downlink slot depends on a downlink transmission bandwidth. A structure of an uplink slot may be the same as that of the downlink slot.

Figure 3:
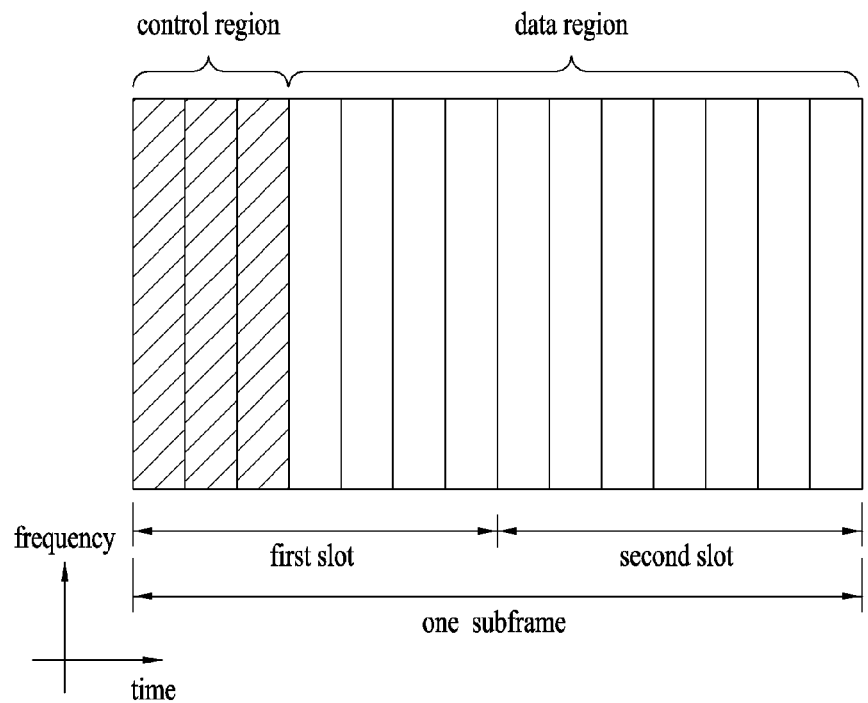
FIG. 3 is a diagram illustrating a structure of a downlink subframe.

FIG. 3 is a diagram illustrating a structure of a downlink subframe.

Maximum three OFDM symbols located at the front of the first slot within one subframe correspond to a control region to which a control channel is allocated. The other OFDM symbols correspond to a data region to which a physical downlink shared channel (PDSCH) is allocated.

Examples of the dovvnlink control channel used in the 3GPP LTE system include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and includes information on the number of OFDM symbols used for transmission of the control channel within the subframe. The PHICH is a response to uplink transmission, and includes HARQ ACK/NACK (acknowledgement/negative-acknowledgement) signal. The control information transmitted through the PDCCH will be referred to as downlink control information (DCI). The DCI includes uplink or downlink scheduling information or uplink transmission (Tx) power control command for a random user equipment group. The PDCCH includes transport format and resource allocation information of a downlink shared channel (DL-SCH), resource allocation information of an uplink shared channel (UL-SCH), paging information of a paging channel (PCH), system information on the DL-SCH, resource allocation information of an upper layer control message such as a random access response transmitted onto the PDSCH, a set of transmission power control commands of an individual user equipment within a random user equipment group, transmission power control information, and activation of voice over Internet protocol (VoIP). A plurality of PDCCHs may be transmitted within the control region, and the user equipment may monitor the plurality of PDCCHs.

The PDCCH is transmitted by aggregation of one or more continuous control channel elements (CCEs). The CCE is a logic allocation unit used to provide a PDCCH at a predetermined coding rate based on the status of a radio channel. The CCE corresponds to a plurality of resource element groups (REGs). The format of the PDCCH and the number of available bits of the PDCCH are determined depending on the correlation between the number of CCEs and the coding rate provided by the CCE.

The base station determines a PDCCH format depending on the DCI transmitted to the user equipment, and attaches cyclic redundancy check (CRC) to the control information. The CRC is masked with a radio network temporary identifier (RNTI) depending on owner or usage of the PDCCH. For example, if the PDCCH is for a specific user equipment, the CRC may be masked with cell-RNTI (C-RNTI) of the corresponding user equipment. If the PDCCH is for a paging message, the CRC may be masked with a paging indicator identifier (P-RNTI). If the PDCCH is for system information (in more detail, system information block (SIB)), the CRC may be masked with system information identifier and system information RNTI (SI-RNTI). The CRC may be masked with a random access RNTI (RA-RNTI) to indicate a random access response that is a response to transmission of a random access preamble of the user equipment.

Figure 4:
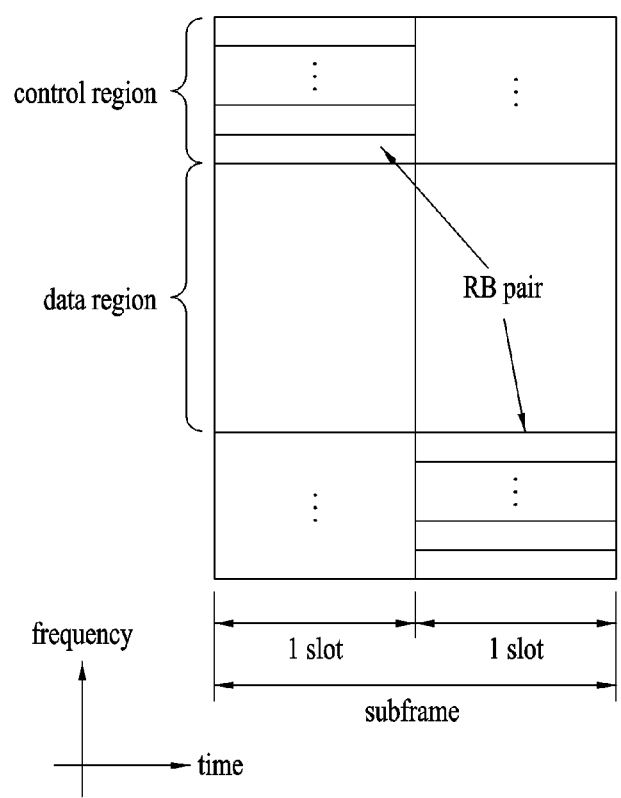
FIG. 4 is a diagram illustrating a structure of an uplink subframe.

FIG. 4 is a diagram illustrating a structure of an uplink subframe.

The uplink subframe may be divided into a control region and a data region on a frequency domain. A physical uplink control channel (PUCCH) which includes uplink control information is allocated to the control region. A physical uplink shared channel (PUSCH) which includes user data is allocated to the data region. In order to maintain single carrier features, one user equipment does not transmit the PUCCH and the PUCCH at the same time. The PUCCH for one user equipment is allocated to resource block (RB) pair for the subframe. Resource blocks (RBs) belonging to the RB pair reserve different subcarriers for two slots. The RB pair allocated to the PUCCH is subjected to frequency hopping at a slot boundary.

Modeling of MIMO System

Figure 5:
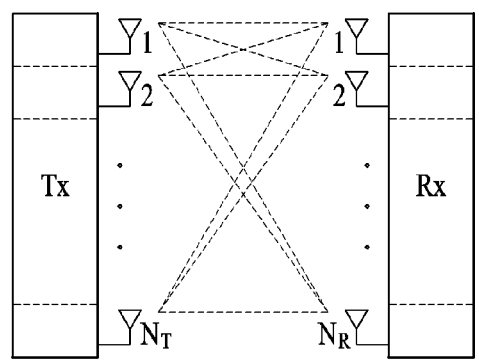
FIG. 5 is a diagram illustrating a wireless communication system having multiple antennas.
Figure 5:
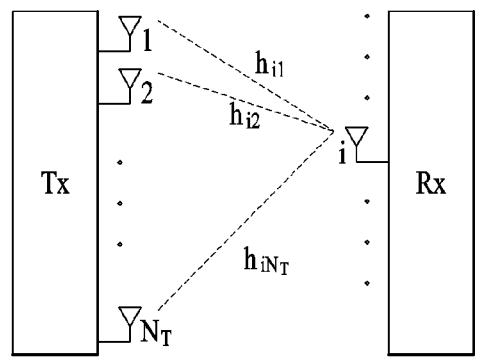

FIG. 5 is a schematic diagram illustrating a wireless communication system having multiple antennas.

As shown in FIG. 5(a), if the number of transmitting antennas is increased to $N_T$ and the number of receiving antennas is increased to $N_R$, channel transmission capacity is increased theoretically in proportion to the number of antennas unlike that a plurality of antennas are used in only a transmitter or a receiver. Accordingly, it is possible to improve a transmission rate and remarkably improve frequency efficiency. As channel transmission capacity is increased, a transmission rate may be increased theoretically as much as a value obtained by multiplying a maximum transmission rate $R_O$, which corresponds to a case where a single antenna is used, by an increase rate $R_i$.

$$R_i = \min(N_T, N_R) \qquad \text{[Equation 1]}$$

For example, in a MIMO communication system that uses four transmitting antennas and four receiving antennas, a transmission rate theoretically four times greater than that of a single antenna system may be obtained. After theoretical capacity increase of the MIMO system has been proved in the middle of 1990, various technologies have been actively studied to substantially improve a data transmission rate. Also, some of the technologies have been already reflected in the standard of various wireless communications such as third generation mobile communication and next generation wireless LAN.

Upon reviewing the recent trend of studies related to the MIMO system, active studies are ongoing in view of various aspects such as the study of information theoretical aspect related to MIMO communication capacity calculation under various channel environments and multiple access environments, the study of radio channel measurement and modeling of a MIMO system, and the study of time space signal processing technology for improvement of transmission reliability and transmission rate.

A communication method in a MIMO system will be described in more detail with reference to mathematical modeling. In the MIMO system, it is assumed that $N_T$ transmitting antennas and $N_R$ receiving antennas exist.

First of all, a transmitting signal will be described. If there exist $N_T$ transmitting antennas, the number of maximum transmission information is $N_T$. The transmission information may be expressed as follows.

$$s = [s_1, s_2, \ldots, s_{N_T}]^T \qquad \text{[Equation 2]}$$

Different kinds of transmission power may be applied to each of the transmission information $s_1, s_2, \ldots, s_{N_T}$. At this time, supposing that each transmission power is $P_1$, $P_2, \ldots, P_{N_T}$, transmission information of which transmission power is controlled may be expressed as follows.

$$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

Also, $\hat{S}$ may be expressed as follows using a diagonal matrix P.

[Equation 4]

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$

It is considered that a weight matrix W is applied to the information vector $\hat{S}$ of which transmission power is controlled, so as to obtain $N_T$ transmitting signals $x_1, x_2, \ldots, x_{N_T}$. In this case, the weight matrix W serves to properly distribute the transmission information to each antenna depending on the channel status, etc. Such transmitting signals $x_1, x_2, \ldots, x_{N_T}$ may be expressed as follows using a vector X.

$$x = \begin{bmatrix} x_1 \\ x_2 \\ \vdots \\ x_i \\ \vdots \\ x_{N_T} \end{bmatrix} \quad \text{[Equation 5]}$$

$$= \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & \ddots & \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_i \\ \vdots \\ \hat{s}_{N_T} \end{bmatrix}$$

$$= W\hat{s}$$

$$= WPs$$

In this case, $W_{ij}$ means a weight value between the ith transmitting antenna and the jth information W may be referred to as a precoding matrix.

If there exist $N_R$ receiving antennas, receiving signals $y_1, y_2, \ldots, y_{N_R}$ of the respective antennas may be expressed by a vector as follows.

$$y=[y_1,y_2,\ldots,y_{N_R}]^T \quad \text{[Equation 6]}$$

In case of channel modeling in the MIMO communication system, channels may be classified depending on indexes of transmitting and receiving antenna indexes. In this case, a channel that passes from the jth transmitting antenna to the ith receiving antenna will be expressed as $h_{ij}$. It is noted that index of the receiving antenna is prior to index of the transmitting antenna in index of $h_{ij}$.

Meanwhile, FIG. 5(b) illustrates channels from $N_T$ transmitting antennas to the receiving antenna i. Several channels may be grouped into one and then may be expressed by a vector and matrix type. As shown in FIG. 5(b), the channels from $N_T$ transmitting antennas to the ith receiving antenna may be expressed as follows.

$$h_i^T=[h_{i1},h_{i2},\ldots,h_{iN_T}] \quad \text{[Equation 7]}$$

Accordingly, all channels from $N_T$ transmitting antennas to $N_R$ receiving antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \quad \text{[Equation 8]}$$

Since additive white Gaussian noise (AWGN) is actually added to the channels after the above channel matrix H. AWGN $n_1, n_2, \ldots, n_{N_R}$ added to each of the $N_R$ receiving antennas may be expressed as follows.

$$n=[n_1,n_2,\ldots,n_{N_R}]^T \quad \text{[Equation 9]}$$

The receiving signals obtained using the above equation modeling may be expressed as follows.

$$y = \begin{bmatrix} y_1 \\ y_2 \\ \vdots \\ y_i \\ \vdots \\ y_{N_R} \end{bmatrix} \quad \text{[Equation 10]}$$

$$= \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix}$$

$$= Hx + n$$

In the meantime, the number of rows and columns of the channel matrix H indicating the channel state is determined by the number of transmitting antennas and the number of receiving antennas. The number of rows in the channel matrix H is the same as the number $N_R$ of receiving antennas, and the number of columns is the same as the number $N_T$ of transmitting antennas. In other words, the channel matrix H may be expressed by $N_R \times N_T$ matrix.

A rank of the matrix is defined by a minimum number of the number of rows and the number of columns, which are independent from each other. Therefore, the rank of the matrix cannot have a value greater than the number of rows or the number of columns. Rank (rank(H)) of the channel matrix H may be limited as follows.

$$\text{rank}(H) \leq \min(N_T, N_R) \quad \text{[Equation 11]}$$

The rank may also be defined by the number of eigen values not 0 when eigen value decomposition is performed for the matrix. Similarly, the rank may be defined by the number of singular values not 0 when singular value decomposition (SVD) is performed for the matrix. Accordingly, in the channel matrix, the rank may physically mean a maximum number of columns or rows that may transmit different kinds of information from a given channel.

In this specification, 'Rank' for MIMO transmission represents the number of paths that may transmit a signal independently at a specific time and a specific frequency resource, and 'the number of layers' represents the number of signal streams transmitted through each path. Generally, since the transmitter transmits layers corresponding to the number of ranks used for signal transmission, the ranks are the same as the number of layers unless mentioned otherwise.

Channel Status Information (CSI)

The MIMO scheme may be divided into an open-loop scheme and a closed-loop scheme. The open-loop MIMO scheme means that a MIMO transmitter performs MIMO transmission without feedback of channel status information from a MIMO receiver. The closed-loop MIMO scheme means that the MIMO transmitter performs MIMO transmission by using the channel status information fed back from the MIMO receiver. In the closed-loop MIMO scheme, each of the transmitter and the receiver may perform beamforming on the basis of the channel status information to obtain multiplexing gain of MIMO transmitting antennas. The transmitter (for example, base station) may allocate an uplink control channel or an uplink shared channel to the receiver (for example, user equipment), so that the receiver may feed the channel status information back.

The user equipment may perform estimation and/or measurement for a downlink channel by using a cell-specific reference signal (CRS) and/or a channel state information-reference signal (CSI-RS). The channel status information (CSI) which is fed back from the user equipment to the base station may include a rank indicator (RI), a precoding matrix index (PMI), and a channel quality indicator (CQI).

The RI is information for a channel rank. The rank of the channel means a maximum number of layers (or streams) that may transmit different kinds of information through the same time-frequency resources. Since the rank value is mainly determined by long term padding of a channel, the rank value may generally be fed back in accordance with a longer period (that is, less frequently) than those of the PMI and the CQI.

The PMI is information for a precoding matrix used for transmission from the transmitter, and is a value that reflects spatial features of a channel. Precoding means that transmission layers are mapped into transmitting antennas, and layer-antenna mapping relation may be determined by a precoding matrix. The PMI corresponds to a precoding matrix index of the base station preferred by the user equipment on the basis of a metric such as a signal-to-interference plus noise ratio (SINR). In order to reduce feedback overhead of precoding information, the transmitter and the receiver previously share a codebook that includes various precoding matrixes; and only an index indicating a specific precoding matrix in the corresponding codebook may be fed back. For example, the PMI may be determined on the basis of RI which is reported most recently.

The CQI is the information indicating channel quality or channel strength. The CQI may be expressed by MCS (modulation and coding scheme) combination which is previously determined. In other words, the CQI index which is fed back represents a corresponding modulation scheme and a code rate. The CQI may be calculated by assuming that the PDSCH may be received without exceeding a predetermined error probability (for example, 0.1) on the assumption that a specific resource region (for example, region specified by valid subframe and/or physical resource block) is set to CQI reference resource and PDSCH transmission exists in the corresponding CQI reference resource. Generally, the CQI becomes a value that reflects received SINR that may be obtained if the base station configures a spatial channel by using the PMI. For example, the CQI may be calculated on the basis of RI and/or PMI which is reported most recently.

In the system (for example, LTE-A system) that supports extended antenna configuration, it is considered that additional multi-user diversity is acquired using a multi-user-MIMO (MU-MIMO) scheme. In case of the MU-MIMO scheme, since an interference channel exists between the user equipments multiplexed in an antenna domain, if the base station performs downlink transmission by using channel status information fed back from one of multiple user equipments, it is required that interference should not occur with the other user equipments. Accordingly, in order that MU-MIMO operation is performed normally, channel status information having exactness higher than that of the SU-MIMO scheme should be fed back.

A new CSI feedback method improved from CSI, which includes the existing RI, PMI and CQI, may be used such that the channel status information may be measured and reported more exactly. For example, the precoding information fed back from the receiver may be indicated by combination of two PMIs (for example, i1 and i2). As a result, more exact PMI may be fed back, and more exact CQI may be calculated and reported on the basis of the more exact PMI.

In the meantime, the CSI may periodically be transmitted through the PUCCH, or may aperiodically be transmitted through the PUSCH. Also, various report modes may be defined depending on which one of RI, first PMI (for example, W1), second PMI (for example, W2) and CQI is fed back and whether PMI and/or CQI which is fed back is for wideband (WB) or subband (SB).

Codebook Based Precoding Scheme

Precoding for properly distributing transmission information in accordance with a channel status of each antenna may be used to support multi-antenna transmission. A codebook based precoding scheme means that a transmitter and a receiver previously defines a set of precoding matrixes, the receiver feeds the most suitable precoding matrix (that is, precoding matrix index (PMI)) back to the transmitter by measuring channel information from the transmitter, and the transmitter applies proper precoding to signal transmission on the basis of PMI. Since the codebook based precoding scheme selects a proper precoding matrix of a set of predetermined precoding matrixes, although optimized precoding is always not used, feedback overhead may be reduced as compared with that optimized precoding information is explicitly fed back to actual channel information.

Figure 6:
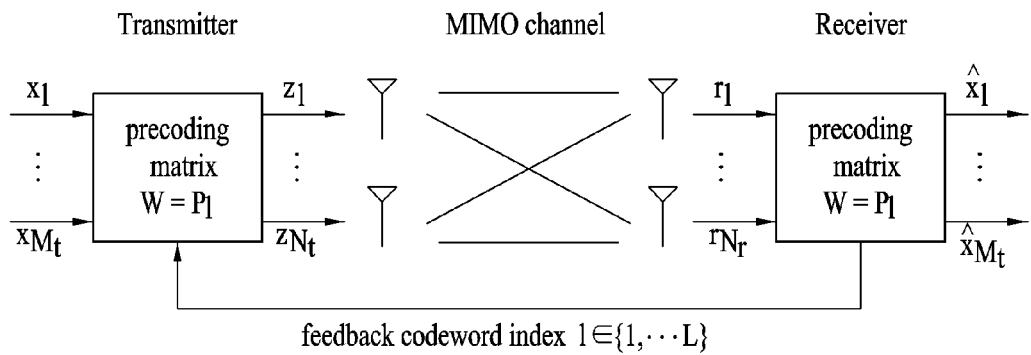
FIG. 6 is a diagram illustrating a basic concept of codebook based precoding.

FIG. 6 is a diagram illustrating a basic concept of codebook based precoding.

According to the codebook based precoding scheme, the transmitter and the receiver share codebook information that includes a predetermined number of precoding matrixes which are previously determined in accordance with a transmission rank, the number of antennas, etc. In other words, if feedback information is finite, the precoding based codebook scheme may be used. The receiver may measure the channel status through a received signal and feed information on infinite number of preferred precoding matrixes (that is, indexes of corresponding precoding matrixes) back to the transmitter on the basis of the aforementioned codebook information. For example, the receiver may select an optimized precoding matrix by measuring the received signal in accordance with a maximum likelihood (ML) scheme or a minimum mean square error (MMSE) scheme. Although FIG. 6 illustrates that the receiver transmits precoding matrix information per codeword to the transmitter, the present invention is not limited to the example of FIG. 6.

The transmitter that has received feedback information from the receiver may select a specific precoding matrix from the codebook on the basis of the received information. The transmitter that has selected the precoding matrix may perform precoding in such a way to multiply layer signals equivalent to transmission ranks by the selected precoding matrix, and may transmit the precoded signals through a plurality of antennas. The number of rows in the precoding matrix is the same as the number of antennas, and the number of columns is the same as the rank value. Since the rank value is the same as the number of layers, the number of columns is the same as the number of layers. For example, if the number of transmitting antennas is 4 and the number of transmission layers is 2, the precoding matrix may be configured as a 4×2 matrix. Information transmitted through each layer may be mapped into each antenna through the precoding matrix.

The receiver that has received the signal precoded by and transmitted from the transmitter may perform inverse processing of precoding performed by the transmitter and recover the received signals. Generally, since the precoding matrix satisfies a unitary matrix (U) condition such as $U*U^H=I$, the inverse processing of precoding may be performed in such a manner that a Hermit matrix $P^H$ of the precoding matrix P used for precoding of the transmitter is multiplied by the received signals.

For example, the following Table 1 illustrates a codebook used for downlink transmission that two transmitting antennas are used in the 3GPP LTE release-8/9, and the following Table 2 illustrates a codebook used for downlink transmission that four transmitting antennas are used in the 3GPP LTE release-8/9.

In Table 2, $W_n^{\{s\}}$ is obtained by a set $\{s\}$ configured from Equation expressed as $W_n=I-2u_n u_n^H/u_n^H u_n$. In this case, I represents a 4×4 single matrix, and $u_n$ is a value given by Table 2.

As illustrated in Table 1, a codebook for two transmitting antennas has a total of seven precoding vectors/matrixes. In this case, since the single matrix is intended for the open-loop system, a total of six precoding vectors/matrixes are obtained for precoding of the closed-loop system. Also a codebook for four transmitting antennas as illustrated in Table 2 has a total of sixty-four precoding vectors/matrixes.

Additionally, in the system (for example, 3GPP LTE release-10 or advanced system) that supports extended antenna configuration, for example, MIMO transmission based on eight transmitting antennas may be performed. A codebook design for supporting MIMO transmission is required.

For CSI report for the channel transmitted through eight antenna ports, it may be considered that codebooks as illustrated in Table 3 to Table 10 are used. Eight CSI-RS antenna ports may be expressed as antenna port indexes 15 to 22. Each of Tables 3 to 10 illustrates an example of a codebook for each of 1-layer, 2-layer, 3-layer, 4-layer, 5-layer, 6-layer, 7-layer, and 8-layer CSI reports based on the antenna ports 15 to 22.

In Table 3 to Table 10, $\phi_n$ and $v_m$ may be given by the following Equation 12.

$$\varphi_n = e^{j\pi n/2}$$

$$v_m = [\,1 \quad e^{j2\pi m/32} \quad e^{j4\pi m/32} \quad e^{j6\pi m/32}\,]^T$$

[Equation 12]

TABLE 1

| Codebook index | Number of rank | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

TABLE 2

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

TABLE 3

| $i_1$ | $i_2$ = 0 | 1 | 2 | 3 | 4 | 5 | 6 | 7 |
|---|---|---|---|---|---|---|---|---|
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ | $W_{2i_1+1,1}^{(1)}$ | $W_{2i_1+1,2}^{(1)}$ | $W_{2i_1+1,3}^{(1)}$ |

| $i_1$ | $i_2$ = 8 | 9 | 10 | 11 | 12 | 13 | 14 | 15 |
|---|---|---|---|---|---|---|---|---|
| 0-15 | $W_{2i_1+2,0}^{(1)}$ | $W_{2i_1+2,1}^{(1)}$ | $W_{2i_1+2,2}^{(1)}$ | $W_{2i_1+2,3}^{(1)}$ | $W_{2i_1+3,0}^{(1)}$ | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$

TABLE 4

| $i_1$ | $i_2$ = 0 | 1 | 2 | 3 |
|---|---|---|---|---|
| 0-15 | $W_{2i_1,2i_1,0}^{(2)}$ | $W_{2i_1,2i_1,1}^{(2)}$ | $W_{2i_1+1,2i_1,0}^{(2)}$ | $W_{2i_1+1,2i_1+1,1}^{(2)}$ |

| $i_1$ | $i_2$ = 4 | 5 | 6 | 7 |
|---|---|---|---|---|
| 0-15 | $W_{2i_1+2,2i_1,0}^{(2)}$ | $W_{2i_1+2,2i_1,1}^{(2)}$ | $W_{2i_1+3,2i_1+3,0}^{(2)}$ | $W_{2i_1+3,2i_1+3,1}^{(2)}$ |

| $i_1$ | $i_2$ = 8 | 9 | 10 | 11 |
|---|---|---|---|---|
| 0-15 | $W_{2i_1,2i_1+1,0}^{(2)}$ | $W_{2i_1,2i_1+1,1}^{(2)}$ | $W_{2i_1+1,2i_1+2,0}^{(2)}$ | $W_{2i_1+1,2i_1+2,1}^{(2)}$ |

| $i_1$ | $i_2$ = 12 | 13 | 14 | 15 |
|---|---|---|---|---|
| 0-15 | $W_{2i_1,2i_1+3,0}^{(2)}$ | $W_{2i_1,2i_1+3,1}^{(2)}$ | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$

TABLE 5

| $i_1$ | $i_2$ = 0 | 1 | 2 | 3 |
|---|---|---|---|---|
| 0-3 | $W_{8i_1,8i_1,8i_1+8}^{(3)}$ | $W_{8i_1+8,8i_1,8i_1+8}^{(3)}$ | $\tilde{W}_{8i_1,8i_1+8,8i_1+8}^{(3)}$ | $\tilde{W}_{8i_1+8,8i_1,8i_1}^{(3)}$ |

| $i_1$ | $i_2$ = 4 | 5 | 6 | 7 |
|---|---|---|---|---|
| 0-3 | $W_{8i_1+2,8i_1+2,4i_1+10}^{(3)}$ | $W_{8i_1+10,8i_1+2,8i_1+10}^{(3)}$ | $\tilde{W}_{8i_1+2,8i_1+10,8i_1+10}^{(3)}$ | $\tilde{W}_{8i_1+10,8i_1+2,8i_1+2}^{(3)}$ |

| $i_1$ | $i_2$ = 8 | 9 | 10 | 11 |
|---|---|---|---|---|
| 0-3 | $W_{8i_1+4,8i_1+4,8i_1+12}^{(3)}$ | $W_{8i_1+12,8i_1+4,8i_1+12}^{(3)}$ | $\tilde{W}_{8i_1+4,8i_1+12,8i_1+12}^{(3)}$ | $\tilde{W}_{8i_1+12,8i_1+4,8i_1+4}^{(3)}$ |

| $i_1$ | $i_2$ = 12 | 13 | 14 | 15 |
|---|---|---|---|---|
| 0-3 | $W_{8i_1+6,8i_1+6,8i_1+14}^{(3)}$ | $W_{8i_1+14,8i_1+6,8i_1+14}^{(3)}$ | $\tilde{W}_{8i_1+6,8i_1+14,8i_1+14}^{(3)}$ | $\tilde{W}_{8i_1+14,8i_1+6,8i_1+6}^{(3)}$ | where $W_{m,m',m''}^{(3)} = \frac{1}{\sqrt{24}} \begin{bmatrix} v_m & v_{m'} & v_{m''} \\ v_m & -v_{m'} & -v_{m''} \end{bmatrix}$, $\tilde{W}_{m,m',m''}^{(3)} = \frac{1}{\sqrt{24}} \begin{bmatrix} v_m & v_{m'} & v_{m''} \\ v_m & v_{m'} & -v_{m''} \end{bmatrix}$

TABLE 6

| $i_1$ | $i_2$ = 0 | 1 | 2 | 3 |
|---|---|---|---|---|
| 0-3 | $W_{8i_1,8i_1+8,0}^{(4)}$ | $W_{8i_1,8i_1+8,1}^{(4)}$ | $W_{8i_1+2,8i_1+10,0}^{(4)}$ | $W_{8i_1+2,8i_1+10,1}^{(4)}$ |

| $i_1$ | $i_2$ = 4 | 5 | 6 | 7 |
|---|---|---|---|---|
| 0-3 | $W_{8i_1+4,8i_1+12,0}^{(4)}$ | $W_{8i_1+4,8i_1+12,1}^{(4)}$ | $W_{8i_1+6,8i_1+14,0}^{(4)}$ | $W_{8i_1+6,8i_1+14,1}^{(4)}$ | where $W_{m,m',n}^{(4)} = \frac{1}{\sqrt{32}} \begin{bmatrix} v_m & v_{m'} & v_m & v_{m'} \\ \varphi_n v_m & \varphi_n v_{m'} & -\varphi_n v_m & -\varphi_n v_{m'} \end{bmatrix}$

TABLE 7

| $i_1$ | $i_2$ = 0 |
|---|---|
| 0-3 | $W_{i_1}^{(5)} = \frac{1}{\sqrt{40}} \begin{bmatrix} v_{2i_1} & v_{2i_1} & v_{2i_1+8} & v_{2i_1+8} & v_{2i_1+16} \\ v_{2i_1} & -v_{2i_1} & v_{2i_1+8} & -v_{2i_1+8} & v_{2i_1+16} \end{bmatrix}$ |

TABLE 8

| $i_1$ | $i_2$ |
|---|---|
| | 0 |
| 0-3 | $W_{i_1}^{(6)} = \frac{1}{\sqrt{48}} \begin{bmatrix} v_{2i_1} & v_{2i_1} & v_{2i_1+8} & v_{2i_1+8} & v_{2i_1+16} & v_{2i_1+16} \\ v_{2i_1} & -v_{2i_1} & v_{2i_1+8} & -v_{2i_1+8} & v_{2i_1+16} & -v_{2i_1+16} \end{bmatrix}$ |

TABLE 9

| $i_1$ | $i_2$ |
|---|---|
| | 0 |
| 0-3 | $W_{i_1}^{(7)} = \frac{1}{\sqrt{56}} \begin{bmatrix} v_{2i_1} & v_{2i_1} & v_{2i_1+8} & v_{2i_1+8} & v_{2i_1+16} & v_{2i_1+16} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} \end{bmatrix}$ |

TABLE 10

| $i_1$ | $i_2$ |
|---|---|
| | 0 |
| 0 | $W_{i_1}^{(8)} = \frac{1}{8} \begin{bmatrix} v_{2i_1} & v_{2i_1} & v_{2i_1+8} & v_{2i_1+8} & v_{2i_1+16} & v_{2i_1+16} & v_{2i_1+24} & v_{2i_1+24} \\ v_{2i_1} & -v_{2i_1} & v_{2i_1+8} & -v_{2i_1+8} & v_{2i_1+16} & -v_{2i_1+16} & v_{2i_1+24} & -v_{2i_1+24} \end{bmatrix}$ |

Multi-Antenna Array and CSI Feedback

Figure 7:
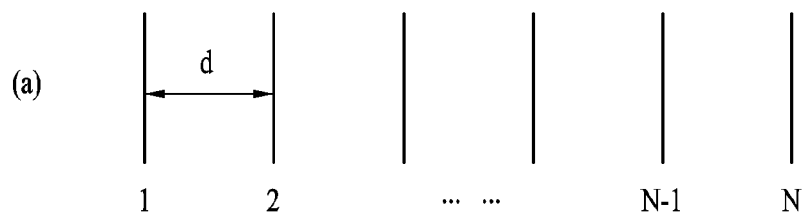
FIG. 7 is a diagram illustrating examples constituting 8 transmitting antennas.
Figure 7:
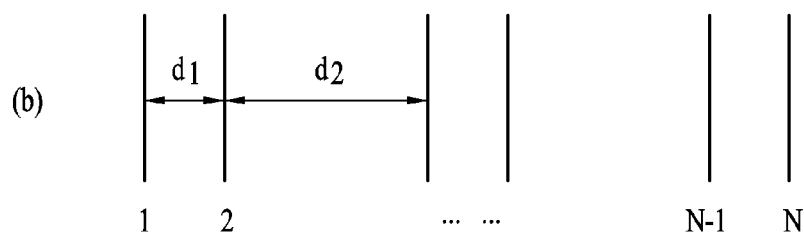
Figure 7:
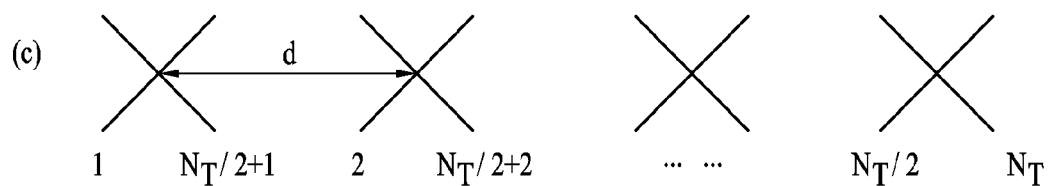

FIG. 7 is a diagram illustrating examples constituting 8 transmitting antennas.

FIG. 7(a) illustrates that N number of antennas configure mutual independent channels without grouping. Generally, this antenna configuration will be referred to as ULA (Uniform Linear Array).

FIG. 7(b) illustrates ULA type antenna configuration of a pair of antennas (Paired ULA). In this case, the pair of antennas may have an associated channel therebetween and have an independent channel from another pair of antennas.

If a plurality of transmitting antennas should be installed in an insufficient space, ULA antenna configuration as illustrated in FIGS. 7(a) and 7(b) may not be appropriate. Accordingly, it may be considered that dual-pole (or cross-pole) antenna configuration as illustrated in FIG. 7(c) is used. If the transmitting antennas are configured in this way, although a distance d between the antennas is relatively short, an independent channel may be configured by lowering antenna correlation, whereby data transmission of high throughput may be performed.

In the example of FIG. 7(c), in array of a total of $N_T$ number of transmitting antennas, a group 1 of indexes 1, 2, . . . , $N_T/2$ and a group 2 of indexes $N_T/2+1$, $N_T/2+2$, . . . , $N_T$ may be configured to have polarizations orthogonal to each other. The antennas of the antenna group 1 may have the same polarization (for example, vertical polarization) and the antennas of the antenna group 2 may have another same polarization (for example, horizontal polarization). Also, the two antenna groups are co-located. For example, antenna 1 and $N_T/2+1$, antenna 2 and $N_1/2+2$, antenna 3 and $N_T/2+3$, . . . , antenna $N_T/2$ and $N_T$ may be co-located. In other words, the antennas within one antenna group have the same polarization like ULA (Uniform Linear Array), and correlation between the antennas within one antenna group has linear phase increment property. Also, correlation between the antenna groups has phase rotation property.

1-dimensional antenna array may include ETA or cross-pole antenna array configuration as illustrated in FIG. 7. If this 1-dimensional antenna array is used, the aforementioned reference signal transmission and CSI feedback method is used. In other words, in order to estimate the channel between the transmitter and the receiver (or base station and user equipment) in downlink transmission, the transmitter may transmit the reference signal (for example, CRS or CSI-RS) to the receiver, and the receiver may estimate the channel status from the reference signal. The receiver may calculate rank, precoding weight value, and CQI based on the precoding weight value, which will be expected to be suitable for downlink data transmission, on the basis the channel information acquired through the reference signal.

For MIMO transmission such as precoded spatial multiplexing, precoding information may be required, wherein the precoding weight value may be configured in a type of codebook.

For example, in the MIMO system that uses four transmitting antennas (hereinafter, referred to as 4Tx), CSI feedback for precoded spatial multiplexing (SM) based on the CRS may be described as follows. When the base station having four transmitting antennas transmits the CRS, if it is assumed that indexes of antenna ports (AP) mapped into each RS are AP0, 1, 2 and 3, the user equipment may estimate the channels from AP0, 1, 2 and 3 by using the CRS.

In this case, if the matrix (or vector) that expresses the channel estimated by the user equipment is H, $H=[H_{11} \ H_{12} \ H_{13} \ H_{14}; H_{21} \ H_{22} \ H_{23} \ H_{24}; \ldots; H_{Nr1} \ H_{Nr2} \ H_{Nr3} \ H_{Nr4}]$ may be expressed. In other words, H may be expressed as Nr×Nt sized matrix (or vector). In this case, Nr is the number of receiving antennas, and Nt is the number of transmitting antennas.

Also, the user equipment may assume that the base station transmits data by using a precoding weight matrix (or vector) $W_m(k)$. In $W_m(k)$, m means a transmission rank, and k means index of the precoding weight matrix (or vector) defined for Rank-m. $W_m(k)$ may be expressed as $W_m(k)=[W_{11} \ W_{12} \ W_{13} \ldots W_{1m}; W_{21} \ W_{22} \ W_{23} \ldots W_{2m}; W_{31} \ W_{32} \ W_{33} \ldots W_{3m}; \ldots; W_{41} \ W_{42} \ W_{43} \ W_{4m}]$. That is, $W_m(k)$ may be expressed as Nt×m sized matrix (or vector).

Also, the use equipment may calculate an equivalent channel $H_{eq}$. The equivalent channel $H_{eq}$ may be calculated by synthesis of the estimated channel H and the precoding weight value $W_m(k)$ (that is, $H_{eq}=HW_m(k)$), or may be calculated by synthesis of a Covariance Matrix R of the estimated channel and the precoding weight value $W_m(k)$ (that is, $H_{eq}=RW_m(k)$). The user equipment may select rank and precoding weight value, which are suitable for downlink transmission, on the basis of the equivalent channel $H_{eq}$. Also, the user equipment may calculate CQI expected when the selected rank and precoding weight value are used.

For another example, in the MIMO system that uses eight transmitting antennas (hereinafter, referred to as 8Tx), CSI feedback for precoded spatial multiplexing (SM) based on the CSI-RS may be described as follows. When the base station having eight transmitting antennas transmits the CSI-RS, if it is assumed that indexes of antenna ports (AP) mapped into each RS are AP 15, 16, 17, 18, 19, 20, 21, 22, the user equipment may estimate the channels from AP 15, 16, 17, 18, 19, 20, 21, 22 by using the CSI-RS.

In this case, if the matrix (or vector) that expresses the channel estimated by the user equipment is H, $H=[H_{11}\ H_{12}\ H_{13}\ H_{14}\ H_{15}\ H_{16}\ H_{17}\ H_{18};\ H_{21}\ H_{22}\ H_{23}\ H_{24}\ H_{25}\ H_{26}\ H_{27}\ H_{28};\ \ldots;\ H_{Nr1}\ H_{Nr2}\ H_{Nr3}\ H_{Nr4}\ H_{Nr5}\ H_{Nr6}\ H_{Nr7}\ H_{Nr8}]$ (wherein Nr is the number of receiving antennas) may be expressed.

Also, the user equipment may assume that the base station transmits data by using a precoding weight matrix (or vector) $W_m(k)$. $W_m(k)$ may be expressed as $W_m(k)=[W_{11}\ W_{12}\ W_{13}\ \ldots\ W_{1m};\ W_{21}\ W_{22}\ W_{23}\ W_{2m};\ W_{31}\ W_{32}\ W_{33}\ W_{3m};\ \ldots\ W_{81}\ W_{82}\ W_{83}\ W_{8m}]$.

Also, the user equipment may select rank and precoding weight value, which are suitable for downlink transmission, on the basis of the equivalent channel $H_{eq}$ (wherein, the equivalent channel is calculated by $H_{eq}=HW_m(k)$ or $H_{eq}=RW_m(k)$), and may calculate CQI expected when the selected rank and precoding weight value are used.

Accordingly, in the MIMO system that supports Nt number of transmitting antennas, the user equipment may feed CSI (for example, RI, PMI, CQI), which is selected/calculated using the CRS or CSI-RS as described above, back to the base station. The base station may determine rank, precoding weight value, and modulation and coding scheme, which are suitable for downlink transmission, by considering the CSI reported by the user equipment.

Multi-Dimensional Antenna Array

Properties of spatial information of the MIMO system may be determined in accordance with antenna array. Antenna array may be divided into a linear array, a circular array, a planar array, and a spherical array in accordance with arrangement array. In the existing wireless communication system (3GPP LTE, IEEE 802.16 based system, WiMAX, IEEE802.11 based system, WiFi, etc.), studies of a method for transmitting multiple antennas when linear array antennas are used have been actively made.

As described above, in the linear array, antennas are arranged on one column. Accordingly, although the linear array may support beamforming for an azimuth angle, the linear array cannot support beamforming for an elevation angle. Beamforming for the azimuth angle is basically operated based on that phase delay is compensated by a difference in arrival time of a plane wave that reaches each antenna location in accordance with the azimuth angle. That is, if the linear array antenna is used, 2-dimensional beamforming (that is, beamforming in an azimuth angle direction) may only be supported.

If the azimuth angle and the elevation angle of the plane wave are considered, phase delay according to a relative distance of antennas arranged three-dimensionally and phase change of a spatial channel according to the phase delay may be expressed as follows. In a 3-dimensional spatial coordinate system, the azimuth angle of the plane wave with respect to a transmitting signal (or received signal) may be expressed as $\psi$ and the elevation angle may be expressed as $\theta$. In the 3-dimensional spatial coordinate system, when a distance to each antenna based on a specific point is expressed as an orthogonal coordinate (dx, dy, dz), phase delay of the plane wave at the antenna located on (dx, dy, dz) based on the specific point is expressed by the following Equation 13.

$$\frac{2\pi}{\lambda}(\sin\theta\cos\psi \cdot d_x + \sin\theta\sin\psi \cdot d_y + \cos\theta \cdot d_z) \quad \text{[Equation 13]}$$

In the Equation 13, $\lambda$ represents a wavelength, $\psi$ represents an azimuth angle, and $\theta$ represents an elevation angle. Also, dx, dy, dz respectively represent distance variation on axes x, y, z.

Also, phase delay is represented by phase change of the spatial channel, and may be expressed by the following Equation 14.

$$e^{j\frac{2\pi}{\lambda}k^T P} = e^{j\frac{2\pi}{\lambda}(\sin\theta\cos\psi \cdot d_x + \sin\theta\sin\psi \cdot d_y + \cos\theta \cdot d_z)} \quad \text{[Equation 14]}$$
$$k = [\sin\theta\cos\psi\ \ \sin\theta\sin\psi\ \ \cos\theta]^T$$
$$P = [d_x\ \ d_y\ \ d_z]^T$$

Based on the method for expressing phase change of the spatial channel in case of the 3-dimensional antenna array expressed in the Equation 14, a method for expressing spatial channel phase change in case of 1-dimensional (or linear) antenna array and 2-dimensional (or planar) antenna array will be described as follows.

Figure 8:
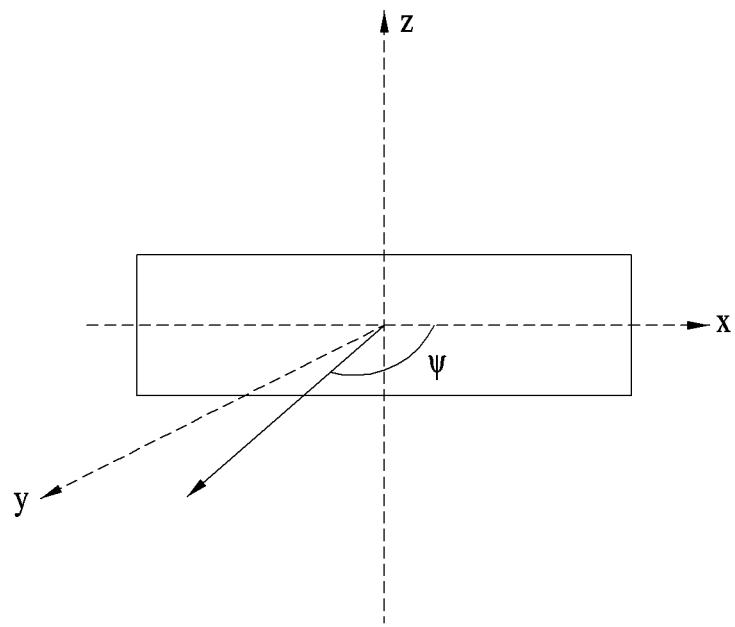
FIG. 8 is a diagram illustrating ULA and URA.
Figure 8:
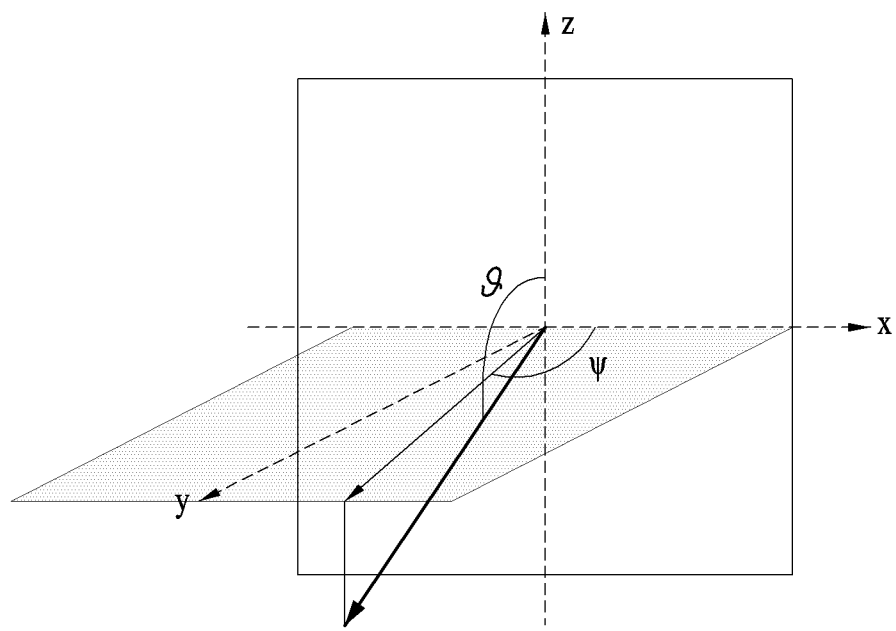

FIG. 8(a) illustrates ULA which is an example of 1-dimensional antenna configuration, and FIG. 8(b) illustrates URA (Uniform Rectangular Array) which is an example of 2-dimensional antenna configuration.

In the example of linear antenna array of FIG. 8(a), since a difference in a distance from a specific point to each antenna occurs on one specific axis of an orthogonal coordinate, only phase change on the specific axis is considered. For example, if beamforming is performed for the azimuth angle, a coordinate variation of x-axis or y-axis direction is assumed on the assumption that the azimuth angle is variable but the elevation angle is fixed. Based on such assumption, phase change of a spatial channel according to phase delay of the plane wave to reach each antenna in the linear antenna array may be expressed by the following Equation 15.

$$e^{j\frac{2\pi}{\lambda}\cos\psi \cdot d_x} \quad \text{[Equation 15]}$$
$$(\theta = 90°, d_y = d_z = 0)$$

In the Equation 15, it is assumed that variation exists on the x-axis only and there is no variation on the y-axis and the z-axis in the linear antenna array.

In order to change the Equation 15 to N-point DFT (Discrete Fourier Transform), if $\cos\psi \cdot d_x$ of the Equation 15 is replaced with $$\frac{k}{N}\lambda n,$$

the following Equation 16 may be expressed.

$$e^{j2\pi \frac{kn}{N}}$$ [Equation 16]

$$(k = 0, \ldots, N-1, n = 0, \ldots, N_{antenna}-1)$$

In the Equation 16, k has one of values 0 to N−1 (that is, N number of values), and N means a unit that decomposes phase. That is, if the value of N becomes greater, since N decomposes more phases, phase change of the spatial channel may be expressed more finely. On the other hand, if the value of N becomes smaller, since N decomposes less phases, phase change of the spatial channel may be expressed coarsely.

In the Equation 16, n has one of values 0 to $N_{antenna}-1$, wherein $N_{antenna}$ means the number of antennas.

If a vector generated based on the Equation 16 is used N number of orthogonal beams may be formed from $N_{antenna}$ number of transmitting antennas. Also, if channels of the transmitter and the receiver are defined on different frequencies in the same manner as the FDD system, it is required to report spatial channel information estimated by the receiver to support beamforming at the transmitter. In this case, the aforementioned DFT based vector (for example, precoding matrix (or vector) defined in 8Tx feedback codebook of the 3GPP LTE release-10 or release-11 as illustrated in Table 3 to Table 10) may be used as a reference value of the spatial channel in formation.

In the example of ULA of FIG. 8(a); N number of antennas are arranged at an interval of $d_x$. A wave for ULA may be expressed as a vector k. ψ represents a direction of the vector k, and corresponds to an azimuth angle on an x-y plane.

A steering vector represents a set of phase delays suffered by the wave, wherein the set of phase delays is determined by antennas belonging to the antenna array. If the steering vector is a, the following Equation may be expressed.

$$\varphi = \frac{d_x}{\lambda}\cos(\psi)$$ [Equation 17]

$$a(\varphi) = [\,1 \quad e^{-j2\pi\varphi} \quad e^{-j2\pi 2\varphi} \quad \ldots \quad e^{-j2\pi(N-1)\varphi}\,]^T$$

In the above Equation 17, λ represents a wavelength. The steering vector a is defined by N×1 sized complex vector, and each of N number of elements of a represents relative phase at each of the antennas of ULA.

If the 2-dimensional antenna array (for example, planar antenna array) as shown in FIG. 8(b) is used 3-dimensional beamforming (that is, beamforming in azimuth angle direction and elevation angle direction) may be supported. In this case, for beamforming that considers both the azimuth angle and the elevation angle, phase delay of the plane wave according to the relative distance of the antennas arranged 2-dimensionally and phase change of the spatial channel according to the phase delay should be considered.

In the example of URA of FIG. 8(b), the antennas are arranged 2-dimensionally on an x-z plane. URA may be referred to as UPA (Uniform Planar Array). This 2-dimensional antenna array is suggested as a method for arranging so many antennas, and may be used for massive MIMO for maximizing advantages of the existing MIMO technology.

The planar antenna array assumes that a distance change between antennas of orthogonal coordinates exists on two axes, the azimuth angle is variable and the elevation angle is also variable. If the planar antennas are arranged over the x-axis and the z-axis, phase delay of the plane wave to reach each antenna in the planar antenna array and phase variation of the spatial channel according to the phase delay may be expressed as follows.

$$e^{j\frac{2\pi}{\lambda}k^T p} = e^{j\frac{2\pi}{\lambda}(\sin\vartheta\cos\psi \cdot d_x + \cos\vartheta \cdot d_z)}$$ [Equation 18]

$$d_y = 0,$$

URA of FIG. 8(b) includes N×M number of antennas. The N×M number of antennas are arranged on the x-axis at an interval of $d_x$, and on the z-axis at an interval of $d_z$. A direction of a wave vector k of URA may be expressed by an azimuth angle ψ on the x-y plane and an elevation angle $\theta_p$ on the y-z plane. Also, a steering matrix for URA may be expressed by the following Equation.

$$A(\theta, \varphi) = a_z(\theta) \cdot a_x(\varphi)^T$$ [Equation 19]

$$a_z(\theta) = [\,1 \quad e^{j2\pi\theta} \quad e^{j2\pi 2\theta} \quad \ldots \quad e^{j2\pi(M-1)\theta}\,]^T$$

$$a_x(\varphi) = [\,1 \quad e^{j2\pi\varphi} \quad e^{j2\pi 2\varphi} \quad \ldots \quad e^{j2\pi(N-1)\varphi}\,]^T$$

$$\varphi = \frac{d_x}{\lambda}\sin(\vartheta)\cos(\psi)$$

$$\theta = \frac{d_z}{\lambda}\cos(\vartheta)$$

In the above Equation 19, A(θ, φ) represents a steering matrix. The steering matrix A(θ, φ) is defined as N×M sized complex matrix, and each of N×M number of elements represents relative phase at each of the antennas of URA.

In the

Equation 18, $e^{j\frac{2\pi}{\lambda}(\sin(\vartheta)\cos(\psi)d_x + \cos(\vartheta)d_z)}$ may be expressed by a product of two vectors $e^{j\frac{2\pi}{\lambda}\sin(\vartheta)\cos(\psi)d_x}$ and $e^{j\frac{2\pi}{\lambda}\cos(\vartheta)d_z}$.

In this case, $$e^{j\frac{2\pi}{\lambda}\sin(\vartheta)\cos(\psi)d_x}$$

of the Equation 18 corresponds to $a_x(\varphi)$ of the Equation 19, and $$e^{j\frac{2\pi}{\lambda}\cos(\vartheta)d_z}$$

of the Equation 18 corresponds to $a_z(\theta)$ of the Equation 19.

As will be aware of it from the Equation 19, phase increment relation on the x-axis in case of z=0 cannot be applied to phase increment relation on the x-axis in case of z=1.

Codebook Design for Multi-Dimensional Antenna Array

A beam formed by the 1-dimensional antenna array like the existing ULA is specified by the azimuth angle (for example, horizontal domain) only and cannot be specified by the elevation angle (for example, vertical domain), whereby 2-dimensional beamforming is only supported. This 1-dimensional antenna array (for example, ULA or cross-pole array configuration) may support adaptive beamforming or spatial multiplexing in a direction of the azimuth angle, and MIMO transmission and reception scheme for the 1-dimensional antenna array is only designed in the existing wireless communication system (for example, system based on 3GPP LTE release-8, 9, 10 and 11).

In the meantime, if 2-dimensional antenna array (for example, URA) based MIMO transmission and reception scheme, which is intended to improve system throughput, is supported, the beam formed by the 2-dimensional antenna array may be specified in the direction of the azimuth angle and the direction of the elevation angle, whereby 3-dimensional beamforming may be performed.

Figure 9:
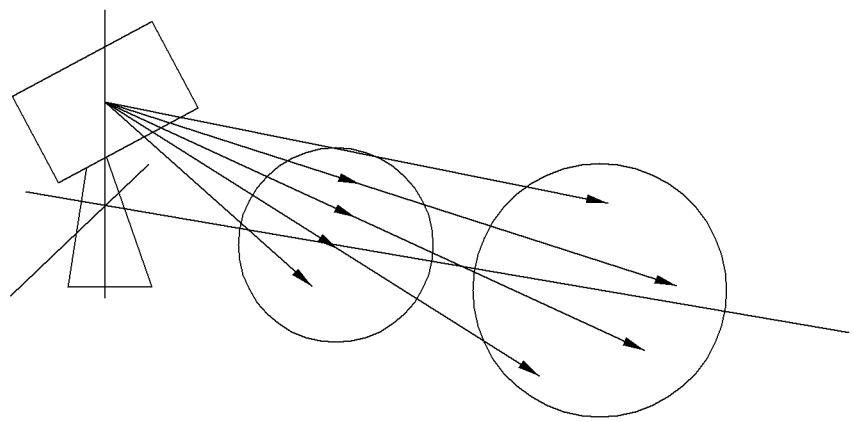
FIG. 9 is a diagram illustrating examples of beamforming based on 2-dimensional antenna array.
Figure 9:
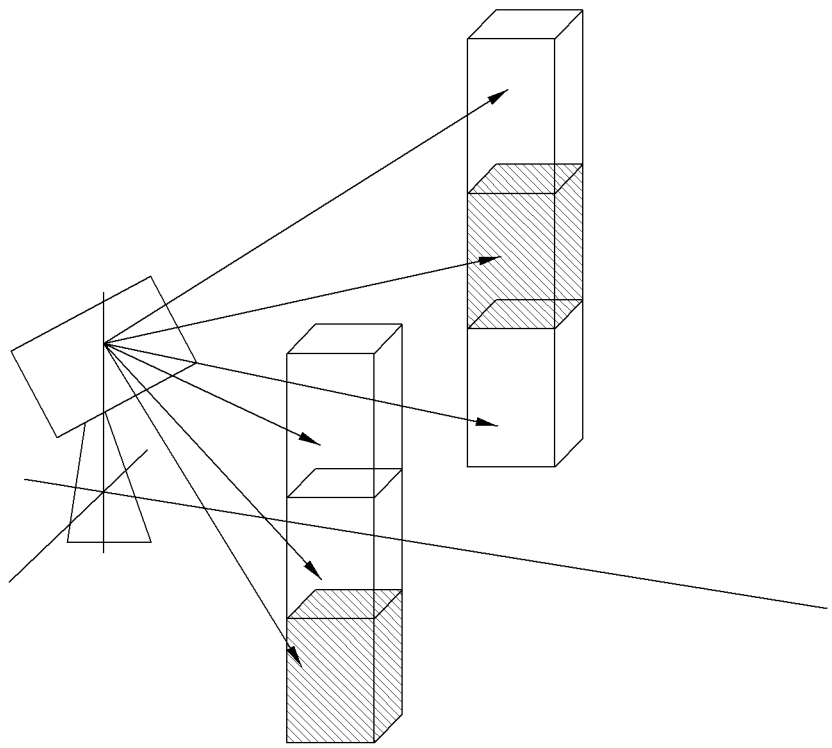

FIG. 9 is a diagram illustrating examples of beamforming based on 2-dimensional antenna configuration.

FIG. 9(a) illustrates examples of sector specific beamforming formed by restricting a certain range of the azimuth angle and a certain range of the elevation angle. FIG. 9(b) illustrates examples of UE-specific beamforming formed by varying the elevation angle on the same azimuth angle.

According to the function of forming the beam by specifying the azimuth angle and the elevation angle as described above, sector specific elevation beamforming (for example, vertical pattern beamwidth and/or downtilt based adaptive control), improved sectorization in the vertical domain, and new beamforming such as user (or UE)-specific elevation beamforming may be supported.

Vertical sectorization may increase average system throughput through gain of a vertical sector pattern, and does not require support of additional standard technology.

UE-specific elevation beamforming may improve SINR to the corresponding UE by designating a vertical antenna pattern in a UE direction. On the other hand, unlike vertical sectorization or sector-specific vertical beamforming, UE-specific elevation beamforming requires support of additional standard technology. For example, in order to normally support 2-dimensional port structure, CSI measurement and feedback method of the UE for UE-specific elevation beamforming will be required.

In order to support UE-specific elevation beamforming, a downlink MIMO improvement method will be required. Examples of the downlink MIMO improvement method may include improvement (for example, new codebook design, method for supporting codebook selection/update/modification, minimization of CSI payload size increase, etc.) of CSI feedback method of the UE, change of CSI-RS configuration for UE-specific elevation beamforming, definition of additional antenna ports for UE-specific elevation beamforming, and improvement (for example, method for obtaining common channel coverage and/or RRM (Radio Resource Management) measurement reliability if the number of antenna ports is increased) of downlink control operation for supporting UE-specific elevation beamforming.

Particularly, for multi-dimensional multi-antenna transmission, it is required to express information on the spatial channel. The present invention suggests a method for designing a codebook that includes values representative of spatial information on multi-dimensional multi-antenna transmission. In more detail, the present invention suggests a method for designing a codebook suitable for multi-dimensional antenna array, which is required to include spatial information including the elevation angle as well as the azimuth angle.

Embodiment 1

A precoding weight value for 3-dimensional beam forming may be expressed by combination of $a_z$ which is a vector/matrix having an elevation angle and $a_x$ which is a vector/matrix having an elevation angle and an azimuth angle. In this case, $a_z$ is a function of an elevation angle component a (that is, first elevation angle component) and is expressed as $a_z(a)$. Also, $a_x$ is a function of an elevation angle component b (that is, second elevation angle component) and an azimuth angle component c, and is expressed as $a_x(b, c)$.

The precoding weight value for 3-dimensional beamforming may be expressed by combination of $a_z$ and $a_x$, wherein a combination scheme may be inner product (embodiment 1-1), Kronecker product (embodiment 1-2) or product (embodiment 1-3).

Embodiment 1-1

The precoding weight value for 3-dimensional beamforming may be expressed by inner product of $a_z$ and $a_x$ as follows.

$$A(a,b,c) = a_z(a) \cdot a_x(b,c)^T$$

$$a_z(a) = [1 \ e^{ja} \ e^{j2a} \ \ldots \ e^{ja(M-1)}]^T$$

$$a_x(b,c) = [1 \ e^{jb \cdot c} \ e^{j2b \cdot c} \ \ldots \ e^{jb \cdot c(N-1)}]^T \quad \text{[Equation 20]}$$

For example, if URA is configured by 16 antennas (for example, M=4 and N=4), $a_z$ may be defined by 4×1 sized vector, and $a_x$ may be defined by 1×4 sized vector. In this case, A(a, b, c) may be expressed by the following Equation 21.

$$a_z(a) = [1 \ e^{ja} \ e^{j2a} \ e^{j3a}]^T \quad \text{[Equation 21]}$$

$$a_x(b, c) = [1 \ e^{jb \cdot c} \ e^{j2b \cdot c} \ e^{j3b \cdot c}]^T$$

$$a_x(b, c)^T = [1 \ e^{jb \cdot c} \ e^{j2b \cdot c} \ e^{j3b \cdot c}]$$

$$A(a, b, c) = a_z(a) \cdot a_x(b, c)^T$$
$$= [1 \ e^{ja} \ e^{j2a} \ e^{j3a}]^T \cdot [1 \ e^{jb \cdot c} \ e^{j2b \cdot c} \ e^{j3b \cdot c}]$$
$$= \begin{bmatrix} 1 & e^{jb \cdot c} & e^{j2b \cdot c} & e^{j3b \cdot c} \\ e^{ja} & e^{ja} \cdot e^{jb \cdot c} & e^{ja} \cdot e^{j2b \cdot c} & e^{ja} \cdot e^{j3b \cdot c} \\ e^{j2a} & e^{j2a} \cdot e^{jb \cdot c} & e^{j2a} \cdot e^{j2b \cdot c} & e^{j2a} \cdot e^{j3b \cdot c} \\ e^{j3a} & e^{j3a} \cdot e^{jb \cdot c} & e^{j3a} \cdot e^{j2b \cdot c} & e^{j3a} \cdot e^{j3b \cdot c} \end{bmatrix}$$

Alternatively, the precoding weight value for 3-dimensional beamforming may be expressed by inner product of $a_z$ and $a_x$ as follows.

$$A(a,b,c) = a_x(b,c) \cdot a_z(a)^T$$

$$a_z(a) = [1 \ e^{ja} \ e^{j2a} \ \ldots \ e^{ja(M-1)}]^T$$

$$a_x(b,c) = [1 \ e^{jb \cdot c} \ e^{j2b \cdot c} \ \ldots \ e^{jb \cdot c(N-1)}]^T \quad \text{[Equation 22]}$$

If the precoding weight value is defined as expressed in the Equation 22, on the assumption of 4×4 transmission antenna array, A(a, b, c) may be expressed by the following Equation 23.

$$A(a, b, c) = a_x(b, c) \cdot a_z(a)^T \quad \text{[Equation 23]}$$
$$= [1 \ e^{jb \cdot c} \ e^{j2b \cdot c} \ e^{j3b \cdot c}]^T \cdot$$
$$[1 \ e^{ja} \ e^{j2a} \ e^{j3a}]$$

-continued $$= \begin{bmatrix} 1 & e^{ja} & e^{j2a} & e^{j3a} \\ e^{jb \cdot c} & e^{jb \cdot c} \cdot e^{ja} & e^{jb \cdot c} \cdot e^{j2a} & e^{jb \cdot c} \cdot e^{j3a} \\ e^{j2b \cdot c} & e^{j2b \cdot c} \cdot e^{ja} & e^{j2b \cdot c} \cdot e^{j2a} & e^{j2b \cdot c} \cdot e^{j3a} \\ e^{j3b \cdot c} & e^{j3b \cdot c} \cdot e^{ja} & e^{j3b \cdot c} \cdot e^{j2a} & e^{j3b \cdot c} \cdot e^{j3a} \end{bmatrix}$$

Embodiment 1-2

The precoding weight value for 3-dimensional beamforming may be expressed by Kronecker product of $a_z$ and $a_x$ as follows.

$$A(a,b,c) = a_z(a) \otimes a_x(b,c)$$

$$a_z(a) = [1 \; e^{ja} \; e^{j2a} \; \ldots \; e^{ja(M-1)}]^T$$

$$a_x(b,c) = [1 \; e^{jb \cdot c} \; e^{j2b \cdot c} \; \ldots \; e^{jb \cdot c(N-1)}]^T \quad \text{[Equation 24]}$$

For example, if URA is configured by 16 antennas (for example, M=4 and N=4), $a_z$ may be defined by 4×1 sized vector, and $a_x$ may be defined by 1×4 sized vector. In this case, A(a, b, c) may be expressed by the following Equation 25.

$$A(a,b,c) = a_z(a) \otimes a_x(b,c) = [1 \; e^{ja} \; e^{j2a} \; e^{j3a}]^T \otimes [1 \; e^{jb \cdot c} \; e^{j2b \cdot c} \; \ldots \; e^{jb \cdot c(N-1)}]^T = [1 \; e^{jb \cdot c} \; e^{j2b \cdot c} \; e^{j3b \cdot c} \; e^{ja} \; e^{ja} \cdot e^{jb \cdot c} \; e^{ja} \cdot e^{j2b \cdot c} \; e^{ja} \cdot e^{j3b \cdot c} \; e^{j2a} \; e^{j2a} \cdot e^{jb \cdot c} \; e^{j2a} \cdot e^{j2b \cdot c} \; e^{j2a} \cdot e^{j3b \cdot c} \; e^{j3a} \; e^{j3a} \cdot e^{jb \cdot c} \; e^{j3a} \cdot e^{j2b \cdot c} \; e^{j3a} \cdot e^{j3b \cdot c}]^T \quad \text{[Equation 25]}$$

Alternatively, the precoding weight value for 3-dimensional beamforming may be expressed by Kronecker product of $a_x$ and $a_z$ as follows.

$$A(a,b,c) = a_x(b,c) \otimes a_z(a)$$

$$a_z(a) = [1 \; e^{ja} \; e^{j2a} \; \ldots \; e^{ja(M-1)}]^T$$

$$a_x(b,c) [1 \; e^{jb \cdot c} \; e^{j2b \cdot c} \; \ldots \; e^{jb \cdot c(N-1)}]^T \quad \text{[Equation 26]}$$

For example, if URA is configured by 16 antennas (for example, M=4 and N=4), $a_z$ may be defined by 4×1 sized vector, and $a_x$ may be defined by 1×4 sized vector. In this case, A(a, b, c) may be expressed by the following Equation 27.

$$A(a,b,c) = a_x(b,c) \otimes a_z(a) = [1 \; e^{jb \cdot c} \; e^{j2b \cdot c} \; \ldots \; e^{jb \cdot c(N-1)}]^T \otimes [1 \; e^{ja} \; e^{j2a} \; e^{j3a}]^T = [1 \; e^{ja} \; e^{j2a} \; e^{j3a} \; e^{jb \cdot c} \; e^{jb \cdot c} \cdot e^{ja} \; e^{jb \cdot c} \cdot e^{j2a} \; e^{jb \cdot c} \cdot e^{j3a} \; e^{j2b \cdot c} \; e^{j2b \cdot c} \cdot e^{ja} \; e^{j2b \cdot c} \cdot e^{j2a} \; e^{j2b \cdot c} \cdot e^{j3a} \; e^{j3b \cdot c} \; e^{j3b \cdot c} \cdot e^{ja} \; e^{j3b \cdot c} \cdot e^{j2a} \; e^{j3b \cdot c} \cdot e^{j3a}]^T \quad \text{[Equation 27]}$$

Embodiment 1-3

The precoding weight value for 3-dimensional beamforming may be expressed by product of components of $a_z$ and components of $a_x$.

Various embodiments of the embodiment 1 relate to a scheme for expressing the precoding weight value for 3-dimensional beamforming. According to the embodiment 1, one matrix A determined by a specific {a, b, c} (that is, a set of a first elevation angle component a, a second elevation angle component b, and an azimuth angle component c) value corresponds to one of precoding weight values for 3-dimensional beamforming. For example, it is to be understood that 16 elements of the matrix A in the Equation 21, 23, 25 or 27 represent phase values mapped into each of 16 antennas The codebook for 3-dimensional beamforming may be configured to include a plurality of precoding matrixes A corresponding to a plurality of {a, b, c} values.

Also, the precoding matrix A may be configured by combination of two precoding vectors/matrixes $a_z$ and $a_x$. Accordingly, the 3-dimensional precoding matrix may be defined by combination (inner product, Kronecker product, or product) of an indicator (for example, first PMI or PMIz) indicating the precoding matrix in a z-axis direction and an indicator (for example, second PMI or PMIx) indicating the precoding matrix in an x-axis direction. Accordingly, CSI feedback for spatial channel information for 3-dimensional beamforming may include feedbacks for first and second PMIs (or PMIz and PMIx).

Embodiment 2

This embodiment 2 relates to a method for defining a relation between the first elevation angle component and the second elevation angle component b, which are described in the embodiment 1.

As described above, the precoding weight value for 3-dimensional beamforming may be expressed by combination of a vector/matrix $a_z$ that includes the first elevation angle component a and a vector/matrix $a_x$ that includes the second elevation angle component b and the azimuth angle component c. In this case, the first elevation angle component a of $a_z$ and the second elevation angle component b of $a_x$ may be designed to have a mutual correlation.

Embodiment 2-1

According to this embodiment, the first elevation angle component a and the second elevation angle component b may be defined to have the correlation as expressed by the following Equation.

$$a_z(a) = [1 \; e^{ja} \; e^{j2a} \; \ldots \; e^{ja(M-1)}]^T$$

$$a_x(b,c) = [1 \; e^{jb \cdot c} \; e^{j2b \cdot c} \; \ldots \; e^{jb \cdot c(N-1)}]^T$$

$$a^2 + b^2 = 1 \quad \text{[Equation 28]}$$

It is to be understood that the correlation (that is, $a^2 + h^2 = 1$) between the first elevation angle component a and the second elevation angle component b, which is defined in the Equation 28, may be defined without modification of a basic relation (that is, $\cos(\theta)^2 + \sin(\theta)^2 = 1$) in that a corresponds to $\cos(\theta)$ in the Equation 19 and b corresponds to $\sin(\theta)$ in the Equation 19.

Figure 10:
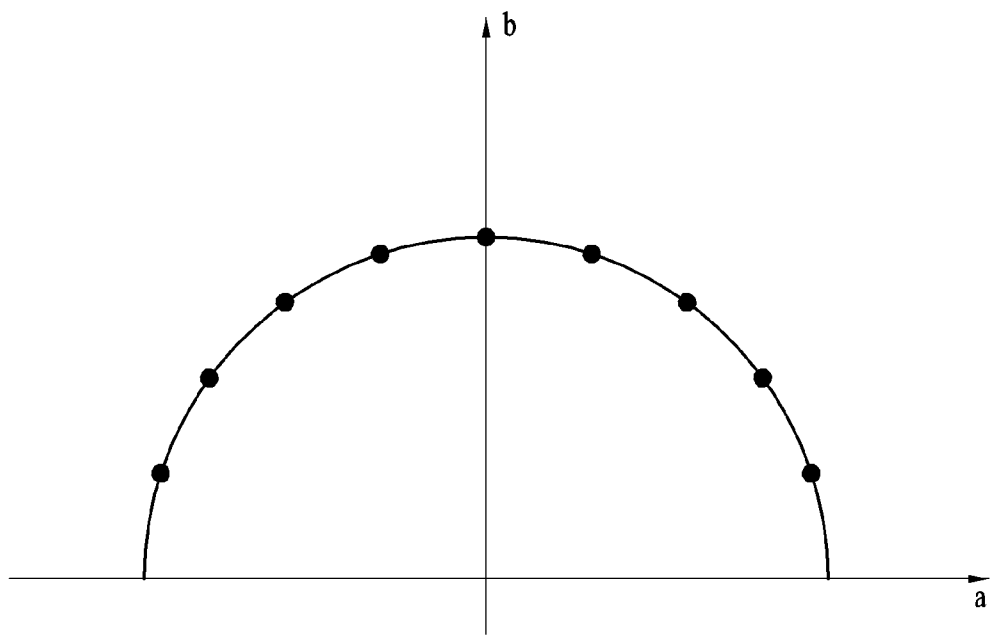
FIG. 10 is a diagram illustrating an example of correlation between a first elevation component 'a' of $a_z$ and a second elevation component 'b' of $a_x$.

FIG. 10 is a diagram illustrating an example of a correlation between a first elevation component a of $a_z$ and a second elevation component b of $a_x$.

If the correlation between the first elevation angle component a of $a_z$ and the second elevation angle component b of $a_x$ is defined as $a^2 + b^2 = 1$, the correlation may be expressed as shown in FIG. 10. In the example of FIG. 10, dots on a semi-circular arc mean candidates of predetermined elevation angle values to determine the precoding weight value. That is, if the number (that is, the number of candidates of elevation angle values) of dots on the semi-circular arc is increased, the interval between the dots becomes narrow. This means that the elevation angle component may be expressed by finer resolution. Also, in the example of FIG. 10, if the number (that is, the number of candidates of elevation angle values) of dots on the semi-circular arc is reduced, the interval between the dots becomes wide. This means that the elevation angle component may be expressed by less fine resolution.

Embodiment 2-2

According to this embodiment, the first elevation angle component a and the second elevation angle component b may be defined to have the correlation expressed by a+b=1. In this case, the relation (that is, a+b=1) between the first elevation angle component a and the second elevation angle component b may be regarded as a linear relation. Also, it is to be understood that the correlation between the first elevation angle component a and the second elevation angle component b is a modification of a basic relation (that is, $\cos(\theta)^2 + \sin(\theta)^2 = 1$).

Figure 11:
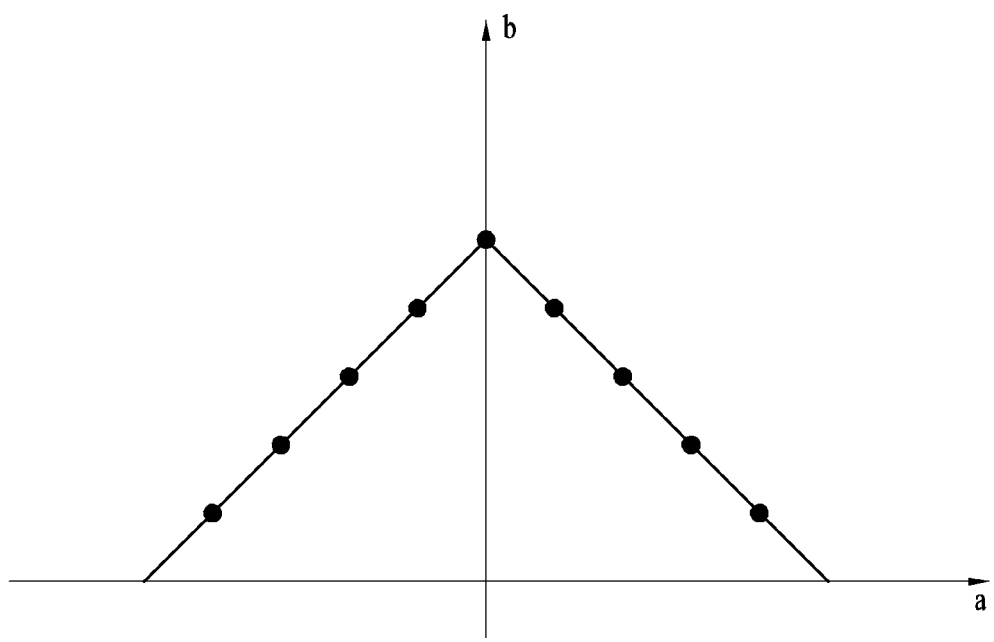
FIG. 11 is a diagram illustrating another example of correlation between a first elevation component 'a' of a, and a second elevation component 'b' of $a_x$.

FIG. 11 is a diagram illustrating another example of a correlation between a first elevation component a of $a_z$ and a second elevation component b of $a_x$.

If the correlation between the first elevation angle component a of $a_z$ and the second elevation angle component b of $a_x$ is defined as $a^2+b^2=1$, the correlation may be expressed as shown in FIG. 11. In the example of FIG. 11, dots on a triangular side mean candidates of predetermined elevation angle values to determine the precoding weight value. That is, if the number (that is, the number of candidates of elevation angle values) of dots on the triangular side is increased, the interval between the dots becomes narrow. This means that the elevation angle component may be expressed by finer resolution. Also, in the example of FIG. 11, if the number (that is, the number of candidates of elevation angle values) of dots on the triangular side is reduced, the interval between the dots becomes wide. This means that the elevation angle component may be expressed by less precise resolution.

Next, as described in the embodiment 1, the matrix A indicating the precoding weight value for 3-dimensional beamforming may be defined by combination of $a_z$ and $a_x$, and the correlation between the first elevation angle component a of $a_z$ and the second elevation angle component b of $a_x$ may be defined as $a^2+b^2=1$ or $a+b=1$ in accordance with this embodiment 2. In this case, in determining/selecting a proper precoding weight value for 3-dimensional beamforming, the elevation angle θ should first be determined, and a proper azimuth angle ψ may be determined based on the determined elevation angle θ.

In more detail, as the elevation angle θ is first determined, the first elevation angle component $a(=\cos(\theta))$ of $a_z$ is determined, whereby $a_z$ may be determined. Also, as the elevation angle θ is determined, the second elevation angle component $b(\sin(\theta))$ of $a_x$ is determined, and as the proper azimuth angle ψ is determined based on the second elevation angle component, the azimuth angle component $c(=\cos(\psi))$ of $a_x$ is determined, whereby $a_x$ may be determined.

If there is no limitation in the correlation between the first elevation angle component a and the second elevation angle component b, after assuming all the possible values of a, values that may be owned by b and c may be assumed to calculate $a_x$. In this case, complexity for selecting/determining the proper precoding matrix/vector may be increased, whereby overhead may occur in view of time delay of the transmitter and/or the receiver and power consumption. If there is limitation in the correlation between the first elevation angle component a of $a_z$ and the second elevation angle component b of $a_x$ in the same manner as this embodiment, complexity for determining proper $a_z$ and $a_x$ may be reduced significantly.

Embodiment 3

This embodiment relates to a method for configuring granularity of an elevation angle component and/or an azimuth angle component.

If the precoding weight value A is expressed by combination of $a_z$ and $a_x$, a method for configuring granularity of the elevation angle component (for example, the aforementioned first elevation angle component) of $a_z$ which is the vector/matrix that includes the elevation angle will be described.

An element taking charge of the elevation angle of $a_z$ is defined to have one of several predetermined decimal values between 0 and 1. In this case, increment (that is, difference value) between the several predetermined decimal values may equally be given by $1/N_e$. Accordingly, the several predetermined decimal values may be expressed as $n_e/N_e$, wherein $n_e$ is given as an integer value which is greater than 0 and less than $N_e-1$ (that is, $n_e=0, 1, 2, \ldots, N_e-1$).

$a_z$ may be expressed by the following Equation.

$$a_z(n_e) = \begin{bmatrix} 1 & e^{j\frac{n_e}{N_e}} & e^{j2\frac{n_e}{N_e}} & \ldots & e^{j\frac{n_e(M-1)}{N_e}} \end{bmatrix}^T \quad \text{[Equation 29]}$$

$$n_e = 0, 1, \ldots, N_e - 1$$

If the elevation angle is divided into $N_e$ number of angles, $N_e$ number of orthogonal beams may be configured in an elevation angle direction. In this case, if the value of $N_e$ becomes greater (that is, if the value of $1/N_e$ becomes smaller), it is to be understood that candidates of the elevation angle component values of $a_z$ are divided more finely, and features in the elevation angle direction of the spatial channel may be expressed more finely.

Next, a method for configuring granularity of an azimuth angle component and an elevation angle component of $a_x$ which is the vector/matrix that includes the elevation angle and the azimuth angle will be described.

An element taking charge of the azimuth angle of $a_x$ is defined to have one of several predetermined decimal values between 0 and 1. In this case, increment (that is, difference value) between the several predetermined decimal values may equally be given by $1/N_a$. Accordingly, the several predetermined decimal values may be expressed as $n_a/N_a$, wherein $n_a$ is given as an integer value which is greater than 0 and less than $N_a-1$ (that is, $n_a$ 0, 1, 2, ..., $N_a-1$).

If the azimuth angle is divided into $N_a$ number of angles, $N_a$ number of orthogonal beams may be configured in an azimuth angle direction. In this case, if the value of $N_a$ becomes greater (that is, if the value of $1/N_a$ becomes smaller), it is to be understood that candidates of the azimuth angle component values of $a_x$ are divided more finely, and features in the azimuth angle direction of the spatial channel may be expressed more finely.

Also, an element taking charge of the elevation angle of $a_x$ is defined as a decimal value between 0 and 1, and may be determined based on the correlation with the value of the element taking charge of the elevation angle of $a_z$. For example, the value of the element (for example, the aforementioned second elevation angle component) taking charge of the elevation angle of $a_x$ may be determined based on the correlation with the value of the element (for example, the aforementioned first elevation angle component) taking charge of the elevation angle of $a_z$ described in the embodiment 2.

Accordingly, $a_x$ may be expressed by the following Equation.

$$a_x(b, n_a) = \begin{bmatrix} 1 & e^{j\frac{b \cdot n_a}{N_a}} & e^{j2\frac{b \cdot n_a}{N_a}} & \ldots & e^{j\frac{b \cdot n_a(N-1)}{N_a}} \end{bmatrix}^T \quad \text{[Equation 30]}$$

$$n_a = 0, 1, \ldots, N_a - 1$$

$$0 < b \leq 1$$

In the Equation 30, b may be defined as expressed by the following Equation 31 or 32.

$$b = \sqrt{1 - \left(\frac{n_e}{N_e}\right)^2} \quad \text{[Equation 31]}$$

$$n_e = 0, 1, \ldots, N_e - 1$$

$$b = 1 - \frac{n_e}{N_e} \quad \text{[Equation 32]}$$

$$n_e = 0, 1, \ldots, N_e - 1$$

The Equation 31 is an example corresponding to the correlation of the embodiment 2-1, and the Equation 32 is an example corresponding to the correlation of the embodiment 2-2.

According to the aforementioned embodiments 1 to 3, the precoding weight value for 3-dimensional beamforming has a structure that the azimuth angle is determined in accordance with the elevation angle. Accordingly, the proper precoding weight value may be determined from the codebook that includes precoding weight values calculated in accordance with the method suggested in the present invention as follows. First of all, the proper precoding matrix (for example, $a_z$, or first PMI indicating specific $a_z$, or PMIx) in the elevation angle direction (or z-axis direction) may be determined, and the proper precoding matrix (for example, $a_x$, or second PMI indicating specific $a_x$, or PMIz) in the azimuth angle direction (that is, x-axis direction) may be determined considering the determined precoding matrix in the elevation angle direction. In this case, the correlation between the first elevation angle of $a_z$ and the second elevation angle of $a_x$ may be defined, whereby overhead in determining/selecting the precoding weight value for 3-dimensional beamforming may be reduced greatly. Also, granularity of the elevation angle component of $a_z$ and granularity of the azimuth angle component of $a_x$ may be defined independently, whereby granularity of beam generated in the elevation angle direction or the azimuth angle direction may be determined precisely or coarsely if necessary.

Embodiment 4

This embodiment suggests a method for defining a correlation between resolution of an azimuth angle component and an elevation component value.

For example, it is assumed that $a_z$ is a vector/matrix that includes a first elevation angle component and $a_x$ is a vector/matrix that includes a second elevation angle component. In this case, resolution of an azimuth angle component constituting $a_x$ may be designed to have a correlation with the elevation angle component (for example, the first elevation angle component) constituting $a_z$ or the elevation angle component (for example, the second elevation angle component) constituting $a_x$.

In 3-dimensional beamforming, a beam direction may be expressed by the elevation angle and the azimuth angle. The elevation angle serves to determine a direction of beam in an up and down direction (or vertical direction) on a spatial coordinate. It is assumed that the elevation angle of 0° corresponds to a vertical beam direction, the elevation angle of 90° corresponds to a horizontal beam direction, and the elevation angle of 180° corresponds to a vertical-downward beam direction (see θ of FIG. 8(b)). In this case, since most of users who use wireless communication are located near the earth's surface, the elevation angle may be determined between 90° and 180°. Also, if the elevation angle is close to a horizontal direction (for example, 90°), a beam toward the earth's surface of a long, distance from a location of an antenna is formed, and if the elevation angle is close to a vertical direction (for example, 180°), a beam toward the earth's surface of a short distance from a location of an antenna is formed. If it is assumed that the beam is formed in a shape of a fan, a range (that is, an arc length of the fan) that is covered by the beam becomes greater if the distance (or radius length of the fan) from the center is increased. That is, if the distance (that is, distance in the horizontal direction) from the antenna is increased, it is difficult for the beam to reach a desired direction even if the beam direction is distorted a little. Considering this point, a beam (that is, beam that requires high exactness) that may cover a wider range should be formed if the elevation angle becomes close to 90° (that is, if the elevation angle is toward the earth's surface of a long distance in a horizontal direction). On the other hand, a beam (that is, beam that allows low exactness) that may cover a narrower range may be formed if the elevation angle becomes close to 180° (that is, if the elevation angle is toward the earth's surface of a short distance in a horizontal direction).

If resolution of the azimuth angle becomes higher, since the direction of all beams is divided more finely, exactness of the beam direction is relatively high. Meanwhile, if resolution of the azimuth angle becomes lower, since the direction of all beams is divided more coarsely, exactness of the beam direction is relatively low. Accordingly, the present invention suggests that resolution of the azimuth angle is set to be high if the elevation angle becomes close to 90° whereas resolution of the azimuth angle is set to be low if the elevation angle becomes close to 180°.

Embodiment 4-1

This embodiment relates to a method for determining resolution of an azimuth angle component constituting $a_x$ in accordance with an elevation angle component (for example, a second elevation angle component) constituting $a_x$.

For example, referring to the Equation 20, 'c' indicating the azimuth angle component of $a_x$ may be subjected to quantization to have variable beam resolution in accordance with a value of a component 'b' indicating the elevation angle of $a_x$.

For example, if the azimuth angle component 'c' constituting $a_x$ is configured in a type of DFT as expressed by the Equation 30, $c=n_a/N_a$ may be expressed. As described above, if the azimuth angle is divided into $N_a$ number of angles, $N_a$ number of orthogonal beams may be configured in the azimuth angle direction. Also, if the value of $N_a$ becomes greater, the beam may be formed more finely (that is, with high resolution) in the azimuth angle direction. And, if the value of $N_a$ becomes smaller, the beam may be formed more coarsely (that is, with low resolution) in the azimuth angle direction.

Also for example, as described with reference to the Equation 28, the elevation angle component 'b' constituting $a_x$ may correspond to $\sin(\theta)$ in the Equation 19. Accordingly, if the elevation angle becomes close to 90°, 'b' has a value close to 1, and if the elevation angle becomes close to 180°, 'b' has a value close to 0.

Accordingly, if the value of 'b' which is the elevation angle component (for example, the second elevation angle component) of $a_x$ becomes close to 1, the value of $N_a$ may be set to 'high', and if the value of 'b' becomes to 0, the value of $N_a$ may be set to 'low'.

Embodiment 4-2

This embodiment relates to a method for determining resolution of an azimuth angle component constituting $a_x$ in accordance with an elevation angle component (for example, a first elevation angle component) constituting $a_z$.

For example, referring to the Equation 20, 'c' indicating the azimuth angle component of $a_x$ may be subjected to quantization to have variable beam resolution in accordance with a value of a component 'a' indicating the elevation angle of $a_z$.

Based on the Equations 29 to 32, 3-dimensional precoding matrix A may be expressed by the following Equation.

$$A(n_e, n_a) = a_z(n_e) \cdot a_x(n_a)^T \quad \text{[Equation 33]}$$

$$a_z(n_e) = \begin{bmatrix} 1 & e^{j\frac{n_e}{N_e}} & e^{j2\frac{n_e}{N_e}} & \cdots & e^{j\frac{n_e(M-1)}{N_e}} \end{bmatrix}^T,$$

$$(n_e = 0, 1, \ldots, N_e - 1)$$

$$a_x(n_a) = \begin{bmatrix} 1 & e^{j\frac{b \cdot n_a}{N_a}} & e^{j2\frac{b \cdot n_a}{N_a}} & \cdots & e^{j\frac{b \cdot n_a(N-1)}{N_a}} \end{bmatrix}^T,$$

$$(n_a = 0, 1, \ldots, N_a - 1)$$

$$b = \sqrt{1 - \left(\frac{n_e}{N_e}\right)^2},$$

or $$b = 1 - \frac{n_e}{N_e}$$

In this case, if the component (for example, the first elevation angle component) 'a' indicating the elevation angle of $a_z$ is configured in a type of DFT as expressed by the Equation 33, $a=n_e/N_e$ may be expressed. In this case, if $N_e$ is a constant, 'a' is determined by the value of $N_e$. That is, it may be regarded that the value of the component (for example, the first elevation angle component) indicating the elevation angle of $a_z$ is determined by $N_e$.

Also, as described with reference to the Equation 28, the elevation angle component $a=n_e/N_e$ constituting a, may correspond to $\cos(\theta)$ in the Equation 19.

Accordingly, if the elevation angle becomes close to 90°, 'n,' has a value close to 0, and if the elevation angle becomes close to 180', '$n_e$' has a value close to $N_e-1$.

Accordingly, if the value of '$n_e$' for determining 'a' which is the elevation angle component (for example, the first elevation angle component) of $a_z$ becomes close to 0, the value of $N_a$ may be set to 'high', and if the value of '$n_e$' becomes to $N_e-1$, the value of $N_a$ may be set to 'low'. This may be expressed by the following Equation.

$$N_{a@n_e=0} > N_{a@n_e=1} > N_{a@n_e=2} > \ldots$$
$$> N_{a one} = N_{a@n_e=N_e-1} \quad \text{[Equation 34]}$$

In the Equation 34, $N_{a@n_e=k}$ means the value of $N_a$ when $n_e=k$.

The aforementioned various embodiments of the present invention suggest the principle of a precoding codebook design on the assumption of 2-dimensional antenna array of N×M. However, the scope of the present invention is not limited to the aforementioned embodiments, and may similarly be applied to even a case where a precoding codebook of a 1-dimensional antenna array is designed, wherein the 1-dimensional antenna array includes a total of N×M antennas arranged 1-dimensionally, and M number of groups, each of which includes N number of 1-dimensional antenna arrays, exist. For example, the precoding codebook design method according to the principle of the present invention may be applied to a case where a first antenna group that includes N number of antennas and a second antenna group that includes another N number of antennas are spaced apart from each other at a sufficient distance and the distance (for example, dx) between N number of antennas in the first antenna group has a similar feature to that of the distance between N number of antennas in the second antenna group.

Figure 12:
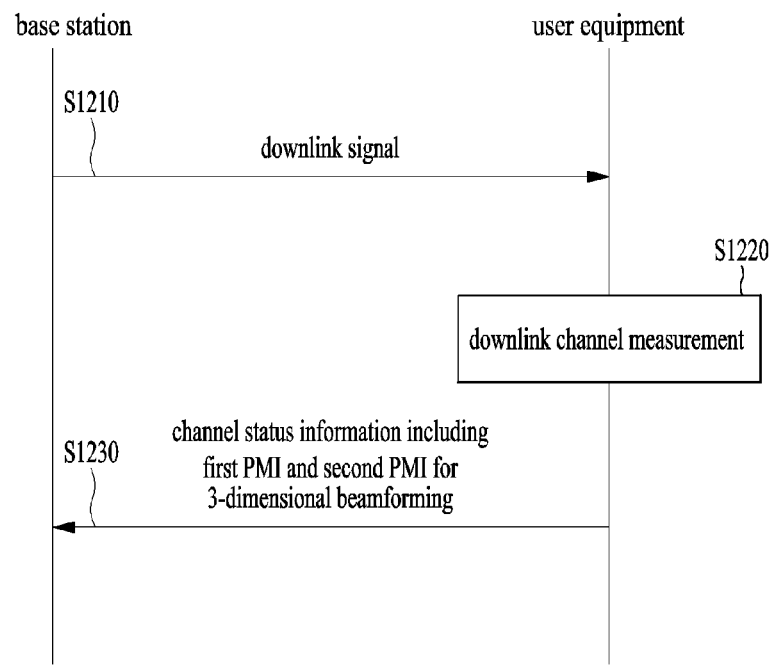
FIG. 12 is a diagram illustrating a method for transmitting and receiving channel status information according to the present invention.

FIG. 12 is a diagram illustrating a method for transmitting and receiving channel status information according to the present invention.

At step S1210, the user equipment may receive a downlink signal (for example, downlink reference signal) from the base station.

At step S1220, the user equipment may measure a downlink channel by using the downlink signal.

At step S1230, the user equipment may determine channel status information on the basis of measurement of the downlink channel. The channel status information may include first PMI and second PMI. The first PMI and the second PMI may be for 3-dimensional beamforming of the base station. For example, the first PMI and the second PMI may indicate a precoding matrix (or preferred by the user equipment) suitable for a spatial channel generated by 2-dimensional antenna array of the base station.

In this case, the first PMI may indicate a precoding vector (for example, $a_z$) that includes the first elevation angle component described in the aforementioned embodiments. The second PMI may indicate a precoding vector (for example, $a_x$) that includes the second elevation angle component and the azimuth angle component described in the aforementioned embodiments.

Also, as described in the aforementioned embodiments, the second elevation angle component (for example, 'b') may be determined on the basis of the first elevation angle component (for example, 'a'). For example, the first elevation angle component and the second elevation component may be determined on the basis of their mutual correlation (for example, $a^2$ $b^2$=1 or a+b=1).

Also, as described in the aforementioned embodiments, resolution of the azimuth angle component (for example, 'c') may be determined on the basis of the first elevation angle component or the second elevation angle component. For example, resolution of the azimuth angle component may be set to 'high' if the elevation angle becomes to 'horizontal', and may be set to 'low' if the elevation angle becomes 'vertical'.

The first PMI may indicate one of candidates of the first precoding vector, and the second first PMI may indicate one of candidates of the second precoding vector. A codebook that includes the precoding matrixes determined by combination of the candidates of the first precoding vector and the candidates of the second precoding vector may be defined. That is, the first PMI and the second PMI may indicate a specific precoding matrix within a predetermined codebook.

Each of the aforementioned various embodiments of the present invention or combination of two or more of the aforementioned various embodiments may be applied to the aforementioned method for transmitting and receiving channel status information, and the repeated description will be omitted for clarification.

Figure 13:
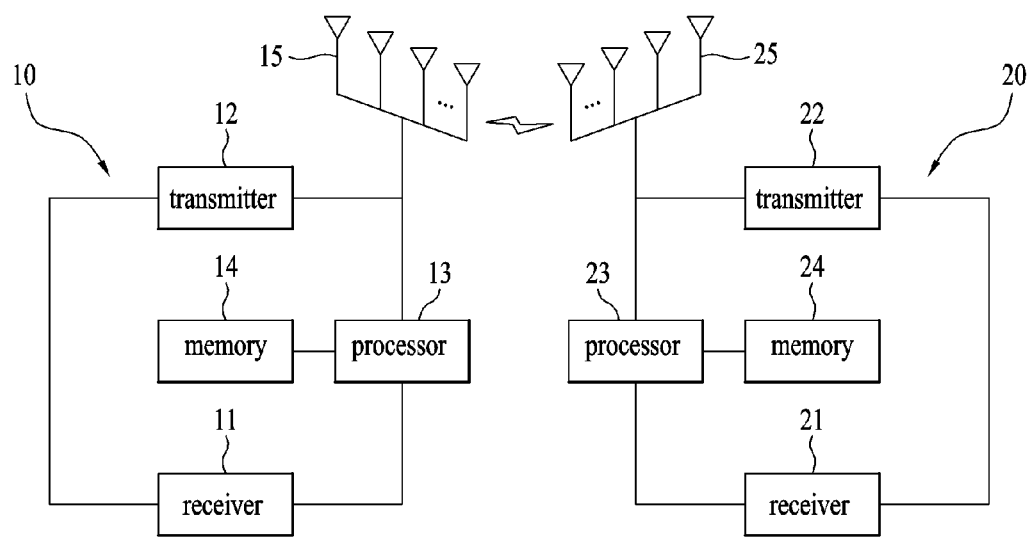
FIG. 13 is a diagram illustrating a base station and a user equipment according the preferred embodiment of the present invention.

FIG. 13 is a diagram illustrating a base station and a user equipment according the preferred embodiment of the present invention.

Referring to FIG. 13, a base station 10 according to the present invention may include a transmitter 11, a receiver 12, a processor 13, a memory 14, and a plurality of antennas 15. The transmitter 11 may transmit various signals, data and information to an external device (for example, user equipment). The receiver 12 may receive various signals, data and information from the external device (for example, user equipment). The processor 13 may control the overall operation of the base station 10. The plurality of antennas 15 may be configured in accordance with a 2-dimensional antenna array, for example.

The processor 13 of the base station 10 according to the embodiment of the present invention may be configured to receive channel status information in accordance with the embodiments suggested in the present invention. In addition, the processor 13 of the base station 10 performs a function of operation-processing information received by the base station 10 and information to be transmitted to the external device. The memory 14 may store the operation-processed information for a predetermined time, and may be replaced with another element such as a buffer (not shown).

Referring to FIG. 13, a user equipment 20 according to the present invention may include a transmitter 21, a receiver 22, a processor 23, a memory 24, and a plurality of antennas 25. The plurality of antennas 25 mean user equipments that support MIMO transmission and reception. The transmitter 21 may transmit various signals, data and information to an external device (for example, base station). The receiver 20 may receive various signals, data and information from the external device (for example, base station). The processor 23 may control the overall operation of the user equipment 20.

The processor 23 of the user equipment 20 according to the embodiment of the present invention may be configured to transmit channel status information in accordance with the embodiments suggested in the present invention. In addition, the processor 23 of the user equipment 20 performs a function of operation-processing information received by the user equipment 20 and information to be transmitted to the external device. The memory 24 may store the operation-processed information for a predetermined time, and may be replaced with another element such as a buffer (not shown).

The details of the aforementioned user equipment 20 may be configured in such a manner that the aforementioned various embodiments of the present invention may independently be applied thereto or two or more embodiments may simultaneously be applied thereto. The repeated description of the details of the user equipment 20 will be omitted for clarification.

Also, in the description of the various embodiments of the present invention, the base station has been exemplarily described as a downlink transmission entity or uplink reception entity, and the user equipment has been exemplarily described as a downlink reception entity or uplink transmission entity. However, the scope of the present invention is not limited to the above example. For example, the description of the base station may equally be applied to a case where a cell, an antenna port, an antenna port group, RRH, a transmission point, a reception point, an access point or a relay becomes a downlink transmission entity to the user equipment or an uplink reception entity from the user equipment. Also, the principle of the present invention described through the various embodiments of the present invention may equally be applied to even a case where the relay becomes a downlink transmission entity to the user equipment or an uplink reception entity from the user equipment, or a case where the relay becomes an uplink transmission entity to the base station or a downlink reception entity from the base station.

The aforementioned embodiments according to the present invention may be implemented by various means, for example, hardware, firmware, software, or their combination.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiments of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The aforementioned embodiments according to the present invention may be applied to various wireless communication Systems.

The invention claimed is:

1. A method for transmitting channel status information from a user equipment in a wireless communication system, the method comprising:
  measuring a downlink channel from a downlink signal received from a base station;
  determining a first precoding matrix indicator (PMI) and a second PMI of the downlink channel on the basis of a measurement of the downlink channel; and
  transmitting the first PMI and the second PMI to the base station,
  wherein:
  the first PMI indicates a first precoding vector including a first elevation angle component of a multi-antenna of the base station,
  the second PMI indicates a second precoding vector including a second elevation angle component and an azimuth angle component of the multi-antenna of the base station, and
  a resolution of the azimuth angle component is determined based on the first elevation angle component or the second elevation angle component.

2. The method according to claim 1, wherein the resolution of the azimuth angle component is set to be high if a beam formed by the multi-antenna is toward a long distance in a horizontal direction from the multi-antenna, whereas the resolution of the azimuth angle component is set to be low if the beam formed by the multi-antenna is toward a short distance in a horizontal direction from the multi-antenna.

3. The method according to claim 1, wherein the resolution of the azimuth angle component is set to be high if the elevation angle becomes close to 'horizontal' but set to be low if the elevation angle becomes close to 'vertical'.

4. The method according to claim 1, wherein the azimuth angle component is $n_a/N_a$, $N_a$ is the number of beams orthogonal to an azimuth angle direction, and $n_a=0, 1, 2, \ldots, N_a-1$.

5. The method according to claim 4, wherein $N_a$ is set to be a great value if the second elevation angle component becomes close to 1 but set to be a small value if the second elevation angle component becomes close to 0.

6. The method according to claim 5, wherein the second elevation angle component is $\sin(\theta)$, and $\theta$ is a value of the elevation angle.

7. The method according to claim 4, wherein the first elevation angle component is $n_e/N_e$, $N_e$ is the number of beams orthogonal to an elevation angle direction, and $n_e=0, 1, 2, \ldots, N_e-1$.

8. The method according to claim 7, wherein $N_{a@n_e=0} > N_{a@n_e=1} > N_{a@n_e=2} > \ldots > N_{a@n_e=N_e-1}$, and $N_{a@n_e=k}$ is a value of $N_a$ when $n_e=k$.

9. The method according to claim 7, wherein $$b = \sqrt{1 - \left(\frac{n_e}{N_e}\right)^2},$$

and 'b' is the second elevation angle component.

10. The method according to claim 7, wherein $$b = 1 - \frac{n_e}{N_e},$$

and 'b' is the second elevation angle component.

11. The method according to claim 1, wherein the first precoding vector is $a_z$, $a_z(a)=[1\ e^{ja}\ e^{j2a}\ \ldots\ e^{ja(M-1)}]^T$, 'a' is the first elevation angle component, and M is the number of vertical antennas.

12. The method according to claim 1, wherein the second precoding vector is $a_x$, $a_x(b, c)=[1\ e^{jb \cdot c}\ e^{j2b \cdot c}\ \ldots\ e^{jb \cdot c(N-1)}]^T$, 'b' is the second elevation angle component, and N is the number of horizontal antennas.

13. A user equipment for transmitting channel status information in a wireless communication system, the user equipment comprising:
 a receiver;
 a transmitter; and
 a processor,
 wherein the processor is configured to:
  measure a downlink channel from a downlink signal received from a base station through the receiver,
  determine a first precoding matrix indicator (PMI) and a second PMI of the downlink channel on the basis of a measurement of the downlink channel, and
  transmit the first PMI and the second PMI to the base station by using the transmitter, wherein:
 the first PMI indicates a first precoding vector including a first elevation angle component of a multi-antenna of the base station,
 the second PMI indicates a second precoding vector including a second elevation angle component and an azimuth angle component of the multi-antenna of the base station, and
 a resolution of the azimuth angle component is determined based on the first elevation angle component or the second elevation angle component.

14. A method for receiving channel status information at a base station in a wireless communication system, the method comprising:
 transmitting a downlink signal, which is used for a measurement of a downlink channel of a user equipment, to the user equipment; and
 receiving a first precoding matrix indicator (PMI) and a second PMI determined based on the measurement of the downlink channel from the user equipment,
wherein:
 the first PMI indicates a first precoding vector including a first elevation angle component of a multi-antenna of the base station,
 the second PMI indicates a second precoding vector including a second elevation angle component and an azimuth angle component of the multi-antenna of the base station, and
 a resolution of the azimuth angle component is determined based on the first elevation angle component or the second elevation angle component.

15. A base station for receiving channel status information in a wireless communication system, the base station comprising:
 a receiver;
 a transmitter; and
 a processor,
 wherein the processor is configured to:
  transmit a downlink signal, which is used for a measurement of a downlink channel of a user equipment, to the user equipment by using the transmitter, and
  receive a first precoding matrix indicator (PMI) and a second PMI determined based on the measurement of the downlink channel from the user equipment by using the receiver,
wherein:
 the first PMI indicates a first precoding vector including a first elevation angle component of a multi-antenna of the base station,
 the second PMI indicates a second precoding vector including a second elevation angle component and an azimuth angle component of the multi-antenna of the base station, and
 a resolution of the azimuth angle component is determined based on the first elevation angle component or the second elevation angle component.

* * * * *